United States Patent
Kakishima et al.

(10) Patent No.: US 8,848,646 B2
(45) Date of Patent: *Sep. 30, 2014

(54) DATA TRANSMITTING METHOD, BASE STATION APPARATUS AND MOBILE STATION APPARATUS

(75) Inventors: Yuichi Kakishima, Tokyo (JP); Hidekazu Taoka, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 60 days.

This patent is subject to a terminal disclaimer.

(21) Appl. No.: 13/643,467

(22) PCT Filed: Apr. 21, 2011

(86) PCT No.: PCT/JP2011/059785
§ 371 (c)(1),
(2), (4) Date: Nov. 20, 2012

(87) PCT Pub. No.: WO2011/136114
PCT Pub. Date: Nov. 3, 2011

(65) Prior Publication Data
US 2013/0083757 A1  Apr. 4, 2013

(30) Foreign Application Priority Data
Apr. 30, 2010  (JP) ................. 2010-105398

(51) Int. Cl.
| | |
|---|---|
| H04W 4/00 | (2009.01) |
| H04H 20/67 | (2008.01) |
| H04B 7/02 | (2006.01) |
| H04B 7/04 | (2006.01) |
| H04W 28/18 | (2009.01) |
| H04L 25/03 | (2006.01) |
| H04B 7/06 | (2006.01) |
| H04W 88/02 | (2009.01) |
| H04W 48/08 | (2009.01) |
| H04W 88/08 | (2009.01) |
| H04L 25/02 | (2006.01) |
| H04W 48/16 | (2009.01) |
| H04L 5/00 | (2006.01) |

(52) U.S. Cl.
CPC .... H04B 7/0413 (2013.01); *H04L 2025/03777* (2013.01); *H04B 7/0639* (2013.01); *H04L 25/03343* (2013.01); *H04W 88/02* (2013.01); H04B 7/024 (2013.01); H04B 7/0417 (2013.01); *H04W 48/08* (2013.01); *H04W 88/08* (2013.01); *H04L 25/0228* (2013.01); H04W 28/18 (2013.01); *H04W 48/16* (2013.01); *H04L 2025/03426* (2013.01); *H04B 7/063* (2013.01); *H04L 5/0051* (2013.01); *H04L 25/0204* (2013.01); *H04L 2025/03414* (2013.01); H04L 5/0023 (2013.01); *H04L 5/0057* (2013.01)
USPC .......................................... 370/329; 370/339

(58) Field of Classification Search
None
See application file for complete search history.

(56) References Cited

U.S. PATENT DOCUMENTS

| | | | |
|---|---|---|---|
| 2009/0213955 A1 | 8/2009 | Higuchi et al. | |
| 2010/0056217 A1* | 3/2010 | Montojo et al. | 455/562.1 |
| 2010/0227569 A1* | 9/2010 | Bala et al. | 455/73 |
| 2011/0026828 A1* | 2/2011 | Balasubramanian et al. | 382/187 |
| 2011/0268050 A1* | 11/2011 | Farajidana et al. | 370/329 |
| 2011/0274102 A1* | 11/2011 | Kim et al. | 370/350 |

FOREIGN PATENT DOCUMENTS

| | | |
|---|---|---|
| JP | 2006-180320 A | 7/2006 |
| JP | 2007-28569 A | 2/2007 |

OTHER PUBLICATIONS

International Search Report w/translation issued in PCT/JP2011/059785 mailed May 31, 2011 (4 pages).
3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8)"; Dec. 2008 (18 pages).

* cited by examiner

Primary Examiner — John Blanton
Assistant Examiner — Christopher Crutchfield
(74) Attorney, Agent, or Firm — Osha Liang LLP

(57) ABSTRACT

A data rate in MIMO transmission is increased to a maximum even when the number of transmitting antennas of a mobile station apparatus is different from the number of transmitting antennas of the mobile station apparatus supported by a base station apparatus. The base station apparatus (eNodeB) reports the maximum number of supported antennas of the mobile station apparatus (UE) supported by the base station apparatus (eNodeB) to the mobile station apparatus (UE) (ST11). The mobile station apparatus (UE) compares the number of supported antennas with the number of transmitting antennas of the mobile station apparatus (UE), selects the smaller number of antennas as a number of virtual antennas (ST12), and reports the number of virtual antennas to the base station apparatus (eNodeB) (ST13). The base station apparatus (eNodeB) instructs the mobile station apparatus to transmit a data channel signal in accordance with the number of virtual antennas (ST15). The mobile station apparatus (UE) transmits a data channel signal to the base station apparatus (eNodeB) in accordance with the number of virtual antennas (ST20).

19 Claims, 8 Drawing Sheets

DATA TRANSMITTING METHOD, BASE STATION APPARATUS AND MOBILE STATION APPARATUS

TECHNICAL FIELD

The present invention relates to a data transmitting method, a base station apparatus and a mobile station apparatus, and more particularly, to a data transmitting method, a base station apparatus and a mobile station apparatus supporting multiantenna transmission.

BACKGROUND ART

In UMTS (Universal Mobile Telecommunications System) networks, attempts are made to adopt HSDPA (High Speed Downlink Packet Access) or HSUPA (High Speed Uplink Packet Access) for the purpose of improving frequency utilization efficiency and improving a data rate to thereby make the most of features of W-CDMA (Wideband Code Division Multiple Access)-based systems. Regarding this UMTS network, Long Term Evolution (LTE) is being studied aiming at a higher data rate and lower delay or the like.

Third-generation systems can generally realize a transmission rate of a maximum of the order of 2 Mbps on a downlink using a fixed band of 5 MHz. On the other hand, LTE-based systems can realize a transmission rate of a maximum of the order of 300 Mbps on a downlink and the order of 75 Mbps on an uplink using a variable band of 1.4 MHz to 20 MHz. Furthermore, in the UMTS networks, a system as the successor- to LTE is also being studied for the purpose of achieving a wider band and higher rate (e.g., LTE Advanced (LTE-A)). For example, in LTE-A, 20 MHz which is the maximum system band of the LTE specification is scheduled to be extended to the order of 100 MHz. Furthermore, In LTE-A, the maximum number (four) of transmission antennas in the LTE specification is scheduled to be increased to eight.

Furthermore, in the LTE-based system, a MIMO (Multi Input Multi Output) system is being proposed as a radio communication technique for transmitting/receiving data using a plurality of antennas and improving a data rate (frequency utilization efficiency) (e.g., see Non-Patent Literature 1). In the MIMO system, a transmitter/receiver is provided with a plurality of transmitting/receiving antennas and different transmission information sequences are simultaneously transmitted from different transmitting antennas. On the other hand, the receiver side separates and detects information sequences which are simultaneously transmitted taking advantage of the fact that different fading fluctuations are generated between the transmitting/receiving antennas, and can thereby increase the data rate (frequency utilization efficiency).

CITATION LIST

Non-Patent Literature

Non-Patent Literature 1: 3GPP TR 25.913 "Requirements for Evolved UTRA and Evolved UTRAN"

SUMMARY OF INVENTION

Technical Problem

In an LTE system, the aforementioned MIMO transmission is applied only to a downlink, and not applied to an uplink. On the other hand, in an LTE-A system (LTE-A system), MIMO transmission is scheduled to be introduced not only to a downlink but also to an uplink. In such MIMO transmission carried out on an uplink, a base station apparatus eNodeB which is a receiver can appropriately comprehend the number of transmitting antennas of a mobile station apparatus UE which is a transmitter (hereinafter referred to as "number of transmitting antennas" as appropriate) and the base station apparatus eNodeB can increase the data rate (frequency utilization efficiency) to a maximum when supporting data communication with the number of transmitting antennas.

On the contrary, when the base station apparatus eNodeB cannot appropriately comprehend the number of transmitting antennas, subsequent data communication may be impossible. Furthermore, even when the number of transmitting antennas can be appropriately comprehended, if the base station apparatus eNodeB does not support data communication with the number of transmitting antennas, it may be difficult to increase the data rate appropriate to the number of antennas provided for the base station apparatus eNodeB. From the standpoint of increasing the data rate, even in such a case, it is preferable to perform data communication using a number of transmitting antennas that allows the data rate to be increased to a maximum based on the number of transmitting antennas and the number of transmitting antennas of a mobile station apparatus UE supported by the base station apparatus eNodeB.

The present invention has been implemented in view of the above-described circumstances, and it is an object of the present invention to provide a data transmitting method, a base station apparatus and a mobile station apparatus capable of increasing a data rate to a maximum in MIMO transmission even when the number of transmitting antennas of the mobile station apparatus is different from the number of transmitting antennas of the mobile station apparatus supported by the base station apparatus.

Solution to Problem

A data transmitting method according to the present invention includes a step of reporting a maximum number of supported antennas of a mobile station apparatus supported by a base station apparatus to the mobile station apparatus, a step of the mobile station apparatus comparing the number of supported antennas with the number of transmitting antennas of the mobile station apparatus and selecting the smaller number of antennas as a number of virtual antennas, a step of reporting the number of virtual antennas to the base station apparatus, a step of instructing the mobile station apparatus to transmit a data channel signal in accordance with the number of virtual antennas and a step of transmitting the data channel signal from the mobile station apparatus in accordance with the number of virtual antennas.

According to this method, of the number of transmitting antennas of the mobile station apparatus and the maximum number of supported antennas of the mobile station apparatus supported by the base station apparatus, the smaller number of antennas is selected as a number of virtual antennas and a data channel signal is transmitted from the mobile station apparatus in accordance with this number of virtual antennas. In this way, it is possible to perform data transmission according to the number of virtual antennas with which the data rate can be increased most effectively between the number of transmitting antennas and the maximum number of supported antennas of the mobile station apparatus supported by the base station apparatus, and thereby increase the data rate to a maximum in MIMO transmission even when the number of transmitting antennas of the mobile station apparatus is different from the number of antennas of the mobile station apparatus supported by the base station apparatus. Furthermore, since the number of virtual antennas is selected based on this number of transmitting antennas provided for the mobile station apparatus, it is possible to avoid such a situation in which the base station apparatus may not appropriately comprehend the number of transmitting antennas, making subsequent data communication impossible.

A base station apparatus according to the present invention includes antenna information transmitting section configured to transmit a maximum number of supported antennas of a mobile station apparatus supported by the base station apparatus to the mobile station apparatus, antenna information receiving section configured to receive, from the mobile station apparatus, a number of virtual antennas made up of the smaller number of antennas of the number of supported antennas and the number of transmitting antennas of the mobile station apparatus, and instruction information transmitting section configured to transmit instruction information for instructing transmission of a data channel signal in accordance with the number of virtual antennas to the mobile station apparatus.

According to this configuration, a maximum number of supported antennas of the mobile station apparatus supported by the base station apparatus is reported to the mobile station apparatus, whereas instruction information for instructing transmission of a data channel signal in accordance with the number of virtual antennas received from the mobile station apparatus is transmitted to the mobile station apparatus. This allows the mobile station apparatus to transmit a data channel signal in accordance with the number of virtual antennas made up of the smaller number of antennas of antennas of the number of transmitting antennas of the mobile station apparatus and the maximum number of supported antennas of the mobile station apparatus supported by the base station apparatus. As a result, since data transmission can be performed with the number of virtual antennas that allows the data rate to be increased most effectively between the number of transmitting antennas of the mobile station apparatus and a maximum number of supported antennas of the mobile station apparatus supported by the base station apparatus, it is possible to increase the data rate to a maximum in MIMO transmission even when the number of transmitting antennas of the mobile station apparatus is different from the maximum number of supported antennas of the mobile station apparatus supported by the base station apparatus.

A mobile station apparatus of the present invention includes antenna information receiving section configured to receive a maximum number of supported antennas of the mobile station apparatus supported by a base station apparatus, selecting section configured to compare the number of supported antennas with the number of transmitting antennas of the mobile station apparatus and selecting the smaller number of antennas as a number of virtual antennas, antenna information transmitting section configured to transmit the number of virtual antennas to the base station apparatus, instruction information receiving section configured to receive instruction information for instructing transmission of a data channel signal in accordance with the number of virtual antennas and data transmitting section configured to transmit a data channel signal in accordance with the number of virtual antennas based on the instruction information.

According to this configuration, the number of virtual antennas made up of the smaller number of antennas of the maximum number of supported antennas of the mobile station apparatus supported by the base station apparatus and the number of transmitting antennas of the mobile station apparatus is transmitted to the base station apparatus, whereas a data channel signal is transmitted in accordance with the number of virtual antennas based on instruction information for instructing transmission of a data channel signal in accordance with the number of virtual antennas. This allows the mobile station apparatus to perform data transmission with the number of virtual antennas that can increase the data rate most effectively between the maximum number of supported antennas of the mobile station apparatus supported by the base station apparatus and the number of transmitting antennas. As a result, it is possible to increase the data rate to a maximum in MIMO transmission even when the number of transmitting antennas of the mobile station apparatus is different from the number of transmitting antennas of the mobile station apparatus supported by the base station apparatus.

Technical Advantage of the Invention

According to the present invention, the smaller number of antennas of the number of transmitting antennas of the mobile station apparatus and the maximum number of supported antennas of the mobile station apparatus supported by the base station apparatus is selected as a number of virtual antennas and a data channel signal is transmitted from the mobile station apparatus in accordance with this number of virtual antennas. This allows data transmission to be performed with the number of virtual antennas that allows the data rate to be increased most effectively between the number of transmitting antennas and the maximum number of supported antennas of the mobile station apparatus supported by the base station apparatus, and it is thereby possible to increase the data rate to a maximum in MIMO transmission even when the number of transmitting antennas of the mobile station apparatus is different from the number of antennas of the mobile station apparatus supported by the base station apparatus.

DESCRIPTION OF EMBODIMENTS

Figure 1:
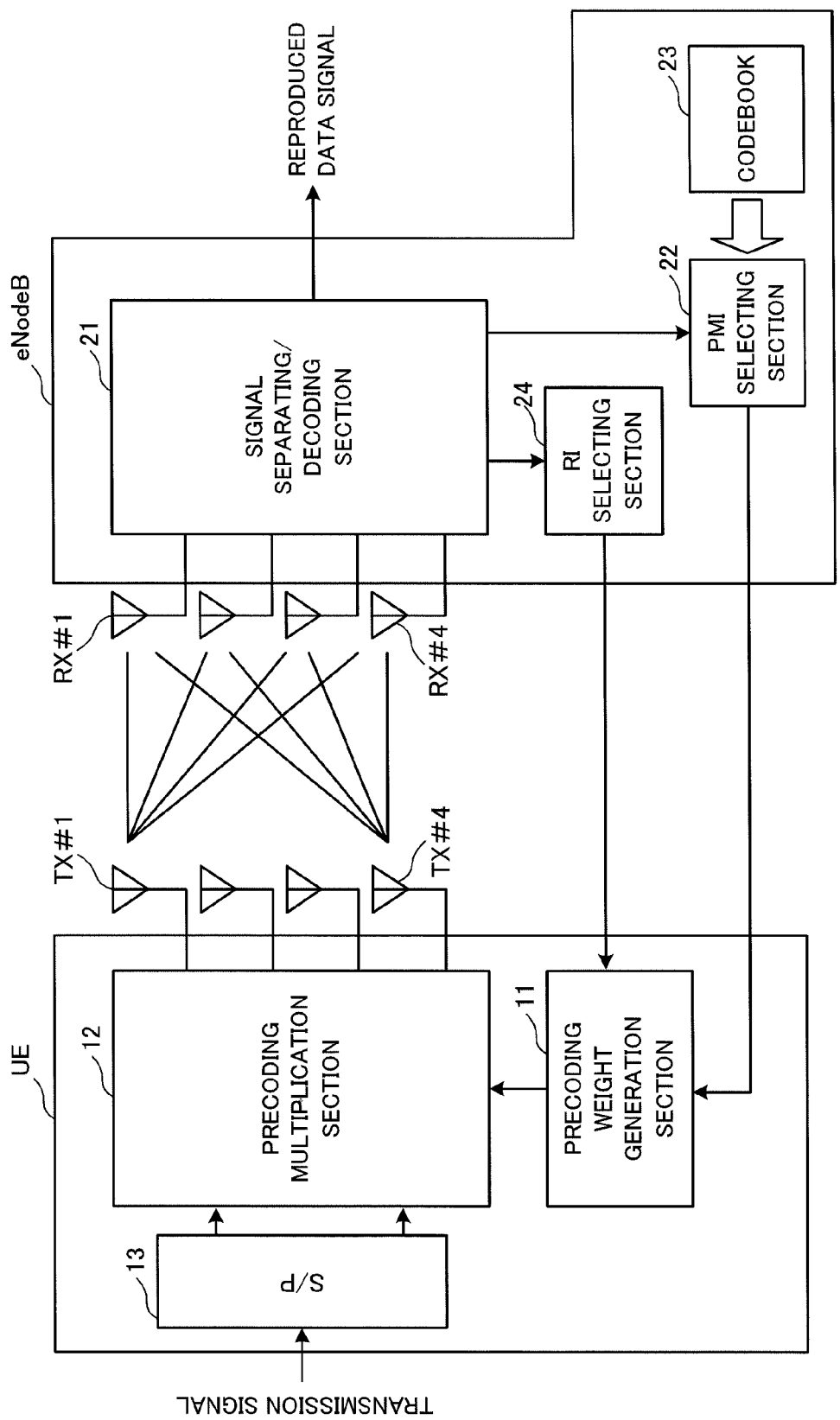
FIG. 1 is a conceptual diagram of a MIMO system to which a data transmitting method according to the present invention is applied.

Hereinafter, embodiments of the present invention will be described in detail with reference to the accompanying drawings. First, uplink MIMO transmission scheduled to be introduced in an LTE-A system will be described using a MIMO system shown in FIG. 1 as a premise. FIG. 1 is a conceptual diagram of a MIMO system to which a data transmitting method according to the present invention is applied. In the MIMO system shown in FIG. 1, a case is shown where a base station apparatus eNodeB and a mobile station apparatus UE are each provided with four antennas.

In uplink MIMO transmission of the MIMO system shown in FIG. 1, the base station apparatus eNodeB measures a channel variation amount using a received signal from each antenna, and based on the measured channel variation amount, selects a PMI and RI corresponding to the phase/amplitude control amounts (precoding weight) that maximize throughput (or reception SINR) of combined transmission data from the respective transmission antennas of the base station apparatus eNode B. The selected PMI and RI (or PMI containing RI information) are fed back to the mobile station apparatus UE over a downlink together with transport block size information (TBS) in accordance with channel quality. The mobile station apparatus UE performs channel coding and data modulation based on the TBS fed back from the base station apparatus eNodeB, performs precoding on the transmission data based on the PMI and RI and then transmits information from each antenna.

In the base station apparatus eNodeB shown in FIG. 1, a signal separating/decoding section 21 separates and decodes control channel signals and data channel signals contained in a received signal received via receiving antennas RX#1 to RX#4 . The signal separating/decoding section 21 applies decoding processing and a data channel signal for the base station apparatus eNodeB is thereby reproduced. A PMI selecting section 22 selects a PMI in accordance with a channel condition estimated by a channel estimation section (not shown). In this case, the PMI selecting section 22 selects an optimum PMI from a codebook 23 that defines a plurality of predetermined N known precoding weights defined per rank in both the mobile station apparatus UE and the base station apparatus eNodeB and a PMI associated with this precoding matrix. An RI selecting section 24 selects an RI in accordance with the channel condition estimated by the channel estimation section. The PMI and RI are transmitted as feedback information to the mobile station apparatus UE together with the TBS.

On the other hand, in the mobile station apparatus UE shown in FIG. 1, a precoding weight generation section 11 generates a precoding weight based on the PMI and RI fed back from the base station apparatus eNodeB. The precoding multiplication section 12 multiplies the transmission signal converted to a parallel signal in a serial/parallel conversion section (S/P) by a precoding weight to thereby control (shift) the phase/amplitude thereof for each of transmitting antennas TX#1 to TX#4. This causes the phase/amplitude-shifted transmission data to be transmitted from the four transmitting antennas TX#1 to TX#4.

In such MIMO transmission (uplink MIMO transmission) carried out in an uplink, the base station apparatus eNodeB needs to appropriately comprehend the number of transmitting antennas of the mobile station apparatus UE. When the base station apparatus eNodeB cannot appropriately comprehend the number of transmitting antennas, subsequent data communication may become impossible. Alternatively, the base station apparatus cannot operate in other than a 1-antenna transmission mode. However, in the LTE-A system, the method for the base station apparatus eNodeB to comprehend the number of transmitting antennas of the mobile station apparatus UE is not clearly defined.

Furthermore, in order to increase the data rate (frequency utilization efficiency) in uplink MIMO transmission, the base station apparatus eNodeB needs to support data communication with the number of transmitting antennas of the mobile station apparatus UE. When the base station apparatus eNodeB does not support data communication with the number of transmitting antennas of the mobile station apparatus UE, it may be difficult to increase the data rate appropriate to the number of antennas provided for the base station apparatus eNodeB. For example, when the mobile station apparatus UE as the communication target supports data communication with 4 antennas (hereinafter referred to as "4-antenna transmission"), whereas the base station apparatus eNodeB supports only data communication with 2 antennas (hereinafter referred to as "2-antenna transmission"), it may be difficult to increase the data rate appropriate to the number of antennas provided for the base station apparatus eNodeB (here, 2 antennas).

The LTE-A system defines a mode (hereinafter referred to as "1-antenna transmission mode") in which data communication is performed virtually using 1 antenna also in uplink MIMO transmission (hereinafter referred to as "1-antenna transmission" as appropriate). As shown in the above example, when the mobile station apparatus UE supports 4-antenna transmission, whereas the base station apparatus eNodeB supports only 2-antenna transmission, data communication may be performed in the 1-antenna transmission mode. However, in this case, the data rate is significantly reduced compared to the data rate obtained through 2-antenna transmission that can be realized in the base station apparatus eNodeB.

From the standpoint of increasing the data rate, even in such a case, it is preferable to perform data communication with the number of transmitting antennas that allows the data rate to be increased most based on the number of transmitting antennas of the mobile station apparatus UE and the maximum number of transmitting antennas of the mobile station apparatus UE supported by the base station apparatus eNodeB. The present inventor came up with the present invention by noticing that failure to appropriately comprehend the number of transmitting antennas of the mobile station apparatus UB may make subsequent data communication impossible or that when the number of transmitting antennas of the base station apparatus eNodeB is different from the number of transmitting antennas of the mobile station apparatus UB supported by the base station apparatus eNodeB, it may be difficult to increase the data rate in MIMO transmission.

In a data transmitting method according to a first aspect of the present invention, the maximum number of supported antennas of the number of transmitting antennas of the mobile station apparatus supported by the base station apparatus eNodeB (hereinafter referred to as "number of supported antennas") is reported to the mobile station apparatus UE first. The mobile station apparatus UE compares the number of supported antennas reported from the base station apparatus eNodeB with the number of transmitting antennas of the mobile station apparatus UE (hereinafter referred to as "transmitting antennas" as appropriate). Of these numbers of antennas, the smaller number of antennas is selected as a number of virtual antennas and this number of virtual antennas is reported to the base station apparatus eNodeB. Next, the base station apparatus eNodeB instructs the mobile station apparatus UE to transmit a data channel signal corresponding to the number of virtual antennas reported from the mobile station apparatus UE. In response to this transmission instruction, the mobile station apparatus UE transmits a data channel signal from the mobile station apparatus UE according to the number of virtual antennas using a MIMO transmission technique.

According to the data transmitting method according to the first aspect of the present invention, the smaller number of antennas of the number of transmitting antennas of the mobile station apparatus UE and the maximum number of supported antennas of the mobile station apparatus UE supported by the base station apparatus eNodeB is selected (hereinafter referred to as "maximum number of supported antennas in the base station apparatus eNodeB" as appropriate) as a number of virtual antennas and a data channel signal is transmitted from the mobile station apparatus UE in accordance with this number of virtual antennas. It is thereby possible to perform data transmission with the number of virtual antennas that allows the data rate to be increased most effectively between the number of transmitting antennas and the maximum number of supported antennas in the base station apparatus eNodeB, and thus increase the data rate to a maximum in MIMO transmission even when the number of transmitting antennas of the mobile station apparatus UE is different from the number of antennas of the mobile station apparatus UE supported by the base station apparatus eNodeB. Furthermore, the number of virtual antennas is selected based on the number of transmitting antennas provided for the mobile station apparatus UE, and it is thereby possible to avoid such a situation in which the base station apparatus eNodeB may not appropriately comprehend the number of transmitting antennas, making subsequent data communication impossible.

Hereinafter, specific examples (a) to (c) of the data transmitting method according to the first aspect of the present invention will be described (for convenience of description, specific examples (a) to (c) will be referred to as "data transmitting methods according to first (a) to (c) aspects" respectively). The data transmitting method according to the present invention is executed at start-up of the mobile station apparatus UE. The data transmitting methods according to the first (a) to (c) aspects differ from each other in information to be multiplexed to report the maximum number of supported antennas in the base station apparatus eNodeB to the mobile station apparatus UE. In the data transmitting method according to the first (a) aspect, the maximum number of supported antennas in the base station apparatus eNodeB is multiplexed with MIB (Master Information Block) information and transmitted. In the data transmitting method according to the first (b) aspect, the maximum number of supported antennas in the base station apparatus eNodeB is multiplexed with SIB (System Information Block) information and transmitted. In the data transmitting method according to the first (c) aspect, the maximum number of supported antennas in the base station apparatus eNodeB is multiplexed with RRC signaling information and transmitted.

Figure 2:
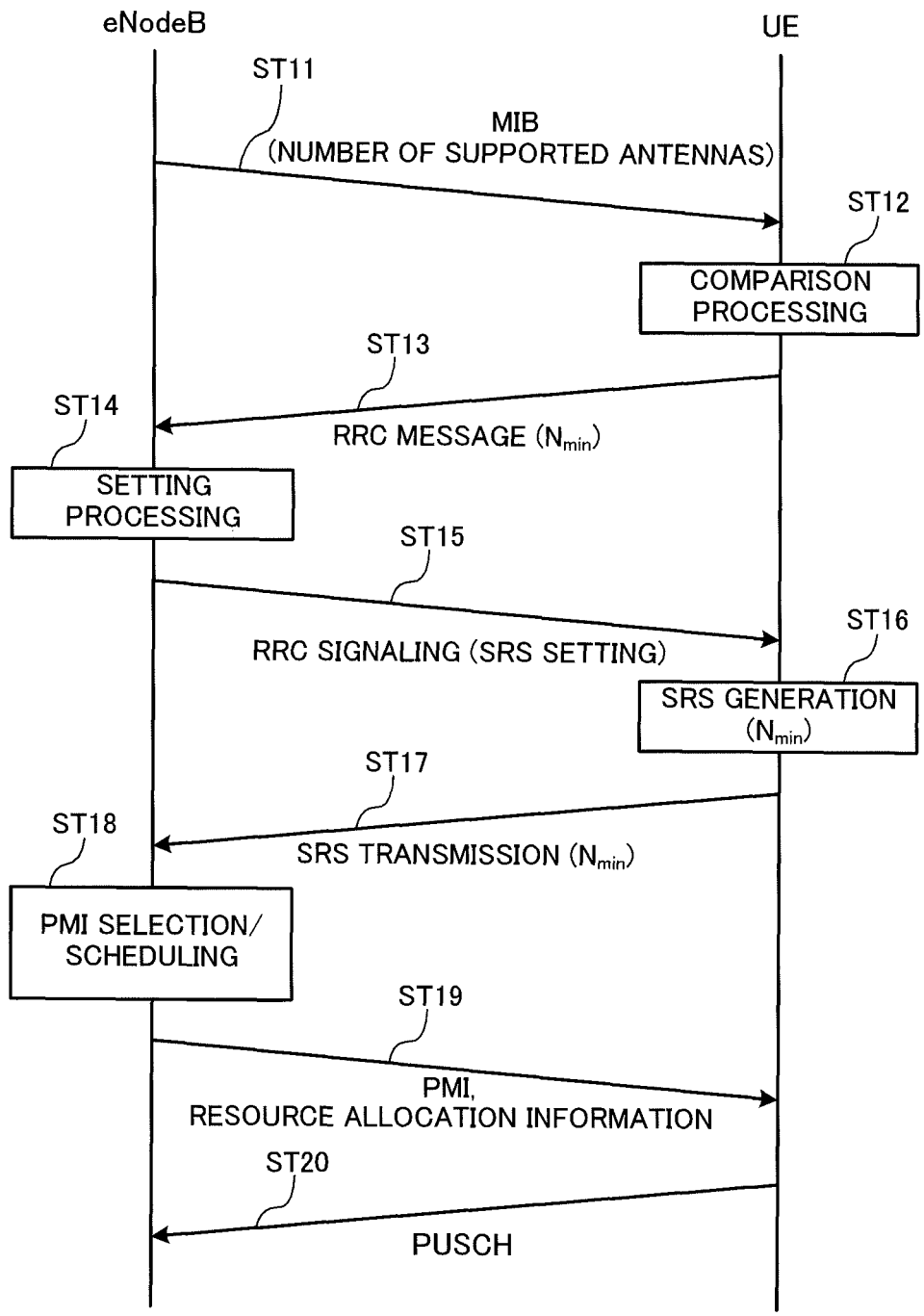
FIG. 2 is a sequence diagram illustrating a data transmitting method according to a first (a) aspect of the present invention.

FIG. 2 is a sequence diagram illustrating the data transmitting method according to the first (a) aspect of the present invention. As shown in FIG. 2, in the data transmitting method according to the first (a) aspect, the maximum number of supported antennas in the base station apparatus eNodeB is multiplexed with MIB information and transmitted from the base station apparatus eNodeB to the mobile station apparatus UE first (step (hereinafter referred to as "ST") 11).

The mobile station apparatus UE demodulates MIB information from the base station apparatus eNodeB. When the mobile station apparatus UE detects the maximum number of supported antennas in the base station apparatus eNodeB from the MIB information, comparison processing of comparing the number of supported antennas with the number of transmitting antennas of the mobile station apparatus UE is performed (ST12). As a result of this comparison processing, the smaller number of antennas of the maximum number of supported antennas in the base station apparatus eNodeB and the number of transmitting antennas is selected as a number of virtual antennas $N_{min}$. The selected number of virtual antennas $N_{min}$ is reported to the base station apparatus eNodeB through an RRC message (ST13).

In the comparison processing, the mobile station apparatus UE identifies the number of transmitting antennas based on the contents of UE capability indicative of capability information of the mobile station apparatus UE. When identifying the number of transmitting antennas, the number of transmitting antennas may be likewise identified based on the contents of UE category indicative of capability information of the mobile station apparatus UE. Since the number of transmitting antennas is identified based on the contents of capability information stored in the mobile station apparatus UE, it is possible to select a number of virtual antennas $N_{min}$ without requiring complicated processing.

Upon receiving a report of the number of virtual antennas $N_{min}$ through the RRC message, the base station apparatus eNodeB performs setting processing required to perform uplink MIMO transmission using the number of virtual antennas $N_{min}$ (ST14). In this setting processing, for example, processing of selecting RI and PMI based on a codebook in accordance with the number of virtual antennas $N_{min}$ is performed. This setting processing allows a data channel signal to be transmitted over an uplink using the number of virtual antennas $N_{min}$ even when the maximum number of supported antennas is different from the number of virtual antennas $N_{min}$.

An instruction of setting an SRS (Sounding Reference Signal) based on the setting contents in the setting processing is multiplexed with RRC signaling information and transmitted to the mobile station apparatus UE (ST15). To be more specific, an SRS setting instruction in accordance with the number of virtual antennas $N_{min}$ is multiplexed with the RRC signaling information and transmitted. This SRS setting instruction constitutes instruction information for instructing transmission of a data channel signal (PUSCH: Physical Uplink Shared Channel) in accordance with the number of virtual antennas $N_{min}$.

Upon receiving an SRS setting instruction through RRC signaling information, the mobile station apparatus UE generates SRSs in accordance with the number of virtual antennas $N_{min}$ (SRSs corresponding to the number of virtual antennas $N_{min}$) (ST16). The SRSs generated are transmitted from a number of transmitting antennas corresponding to the number of virtual antennas $N_{min}$ to the base station apparatus eNodeB (ST17).

The base station apparatus eNodeB estimates channel conditions based on these SRSs and selects PMI in accordance with the channel conditions and performs scheduling processing of assigning radio resources (ST18). The PMI and resource allocation information are transmitted to the mobile station apparatus UE (ST19). The PMI and resource allocation information are transmitted through a control channel signal (PDCCH: Physical Downlink Control Channel).

Upon receiving the PMI and resource allocation information, the mobile station apparatus UE generates a precoding weight based on the PMI and transmits a data channel signal (PUSCH) to the base station apparatus eNodeB through radio resources in accordance with the resource allocation information corresponding to the number of virtual antennas $N_{min}$ (ST20). Thus, the data transmitting method according to the first (a) aspect selects the smaller number of antennas of the maximum number of supported antennas in the base station apparatus eNodeB and the number of transmitting antennas as a number of virtual antennas and transmits the data channel signal (PUSCH) from the mobile station apparatus UE in accordance with this number of virtual antennas.

Here, operation in a case where the number of transmitting antennas of the mobile station apparatus UE is four and the maximum number of supported antennas in the base station apparatus eNodeB is two will be described. In this case, the information that the maximum number of supported antennas in the base station apparatus eNodeB is two is multiplexed with the MIB information and transmitted to the mobile station apparatus UE (ST11). In the comparison processing, "2" which is the maximum number of supported antennas in the base station apparatus eNodeB is compared with "4" which is the number of transmitting antennas of the mobile station apparatus UE, and "2" is selected as the number of virtual antennas $N_{min}$ (ST12). "2" is reported to the base station apparatus eNodeB as the number of virtual antennas through an RRC message (ST13). Setting processing necessary to perform uplink MIMO transmission is performed using 2 antennas which is the number of virtual antennas $N_{min}$ (ST14). Furthermore, an SRS setting instruction in accordance with 2 antennas which is the number of virtual antennas $N_{min}$ is multiplexed with RRC signaling information and transmitted to the mobile station apparatus UE (ST15).

The mobile station apparatus UE generates SRSs corresponding to 2 antennas which is the number of virtual antennas $N_{min}$ (ST16), and the SRSs are transmitted to the base station apparatus eNodeB (ST17). The base station apparatus eNodeB selects PMI based on the SRSs corresponding to 2 antennas which is the number of virtual antennas $N_{min}$ and scheduling processing is performed (ST18). The selected PMI and resource allocation information are transmitted to the mobile station apparatus UE (ST19). The mobile station apparatus UE generates a precoding weight based on the received PMI and transmits a data channel signal (PUSCH) to the base station apparatus eNodeB in accordance with 2 antennas which is the number of virtual antennas $N_{min}$ using radio resources in accordance with resource allocation information (ST20). This allows the mobile station apparatus UE to perform data transmission through single user MIMO that performs data transmission using 2 antennas.

Thus, the data transmitting method according to the first (a) aspect selects the smaller number of antennas of the number of transmitting antennas of the mobile station apparatus UE (e.g., 4 antennas) and the maximum number of supported antennas (e.g., 2 antennas) in the base station apparatus eNodeB as a number of virtual antennas (e.g., 2 antennas) and transmits a data channel signal (PUSCH) from the mobile station apparatus UE in accordance with the number of virtual antennas $N_{min}$. Thus, it is possible to perform data transmission with a number of virtual antennas $N_{min}$ that allows the data rate to be increased most effectively between the number of transmitting antennas and the maximum number of supported antennas in the base station apparatus eNodeB, and thereby increase the data rate to a maximum in MIMO transmission even when the number of transmitting antennas of the mobile station apparatus UE is different from the number of supported antennas of the mobile station apparatus UE supported by the base station apparatus eNodeB.

Particularly, in the data transmitting method according to the first (a) aspect, the maximum number of supported antennas in the base station apparatus eNodeB is multiplexed with MIB information and transmitted, and reported to the mobile station apparatus UE, and it is thereby possible to report the maximum number of supported antennas in the base station apparatus eNodeB to the mobile station apparatus UE with high accuracy and at an early stage.

Figure 3:
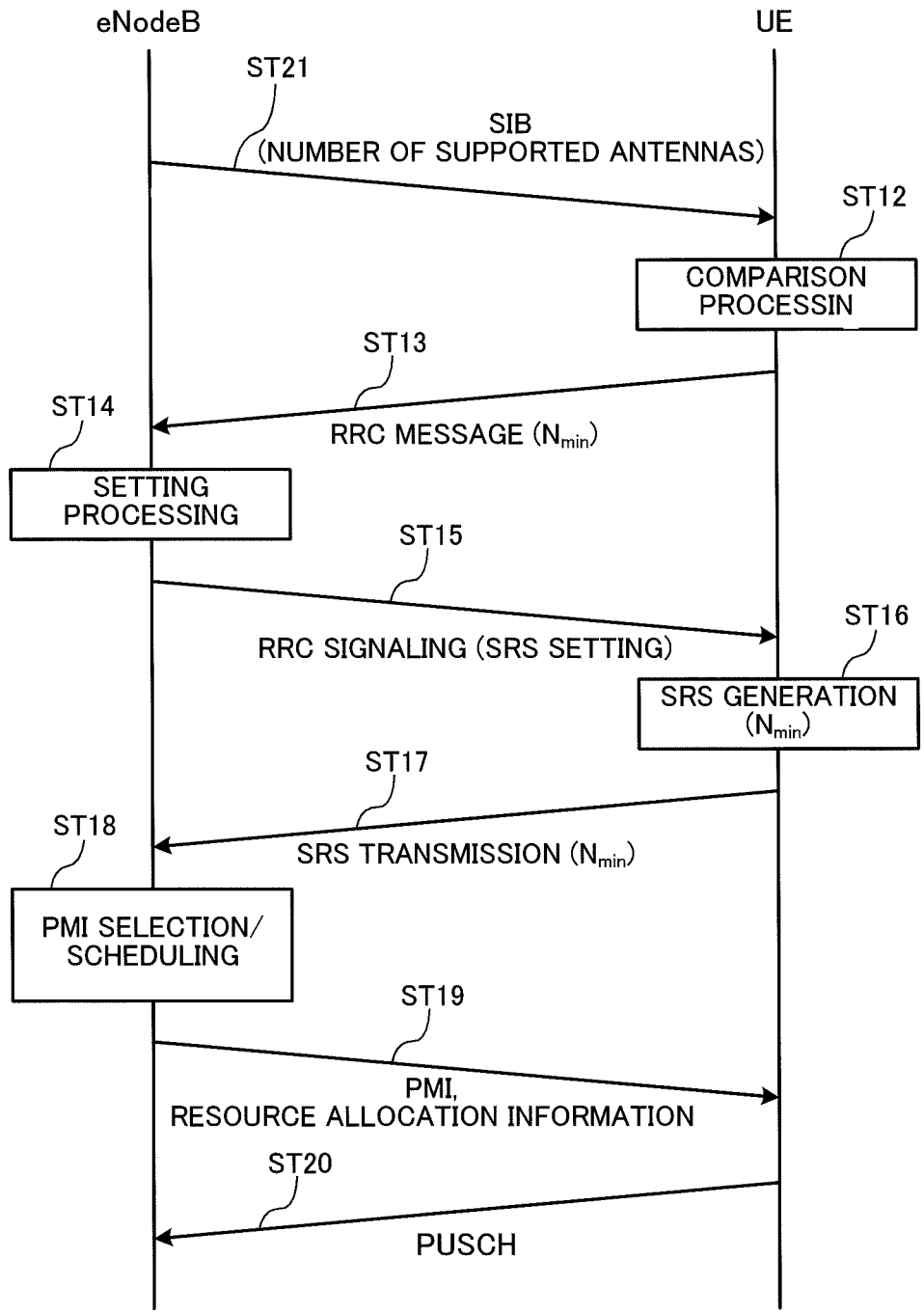
FIG. 3 is a sequence diagram illustrating a data transmitting method according to a first (b) aspect of the present invention.

FIG. 3 is a sequence diagram illustrating the data transmitting method according to the first (b) aspect of the present invention. In the sequence shown in FIG. 3, processes common to those in FIG. 2 are assigned the same reference numerals and descriptions thereof will be omitted.

As shown in FIG. 3, the data transmitting method according to the first (b) aspect is different from the data transmitting method according to the first (a) aspect in that the maximum number of supported antennas in the base station apparatus eNodeB is multiplexed with SIB information and transmitted (ST21). The mobile station apparatus UE demodulates the SIB information from the base station apparatus eNodeB and detects the maximum number of supported antennas in the base station apparatus eNodeB contained in the SIB information. Processes from the comparison process using the detected number of supported antennas onward are common to those in the data transmitting method according to the first (a) aspect.

In the data transmitting method according to the first (b) aspect as in the case of the data transmitting method according to the first (a) aspect, of the number of transmitting antennas of the mobile station apparatus UE and the maximum number of supported antennas in the base station apparatus eNodeB, the smaller number of antennas is selected as a number of virtual antennas, and a data channel signal (PUSCH) is transmitted from the mobile station apparatus UE in accordance with the number of virtual antennas $N_{min}$. Thus, it is possible to perform data transmission with the number of virtual antennas $N_{min}$ that allows the data rate to be increased most effectively between the number of transmitting antennas of the mobile station apparatus UE and the maximum number of supported antennas in the base station apparatus eNodeB, and thereby increase the data rate to a maximum in MIMO transmission even when the number of transmitting antennas of the mobile station apparatus UE is different from the number of supported antennas of the mobile station apparatus UE supported by the base station apparatus eNodeB.

Particularly, in the data transmitting method according to the first (b) aspect, the maximum number of supported antennas in the base station apparatus eNodeB is multiplexed with SIB information and transmitted, and reported to the mobile station apparatus UE, and it is thereby possible to report the maximum number of supported antennas in the base station apparatus eNodeB to the mobile station apparatus UE with high accuracy and at an early stage.

Figure 4:
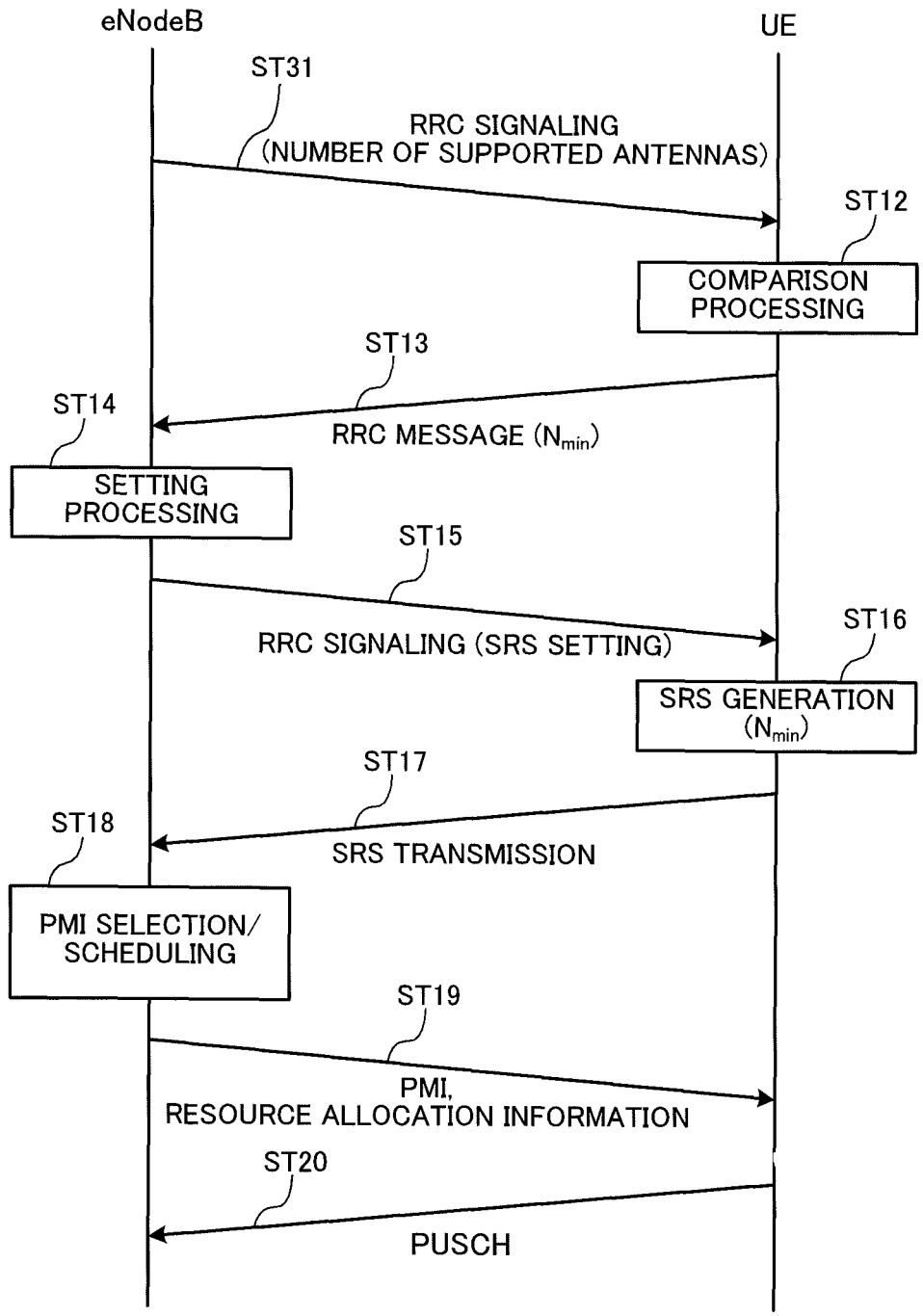
FIG. 4 is a sequence diagram illustrating a data transmitting method according to a first (c) aspect of the present invention.

FIG. 4 is a sequence diagram illustrating the data transmitting method according to the first (c) aspect of the present invention. In the sequence shown in FIG. 4, processes common to those in FIG. 2 are assigned the same reference numerals and descriptions thereof will be omitted.

As shown in FIG. 4, the data transmitting method according to the first (c) aspect is different from the data transmitting method according to the first (a) aspect in that the maximum number of supported antennas in the base station apparatus eNodeB is multiplexed with RRC signaling information and transmitted (ST31). The mobile station apparatus UE demodulates the RRC signaling information from the base station apparatus eNodeB and detects the maximum number of supported antennas in the base station apparatus eNodeB contained in the RRC signaling information. Processes from the comparison process using the detected number of supported antennas onward are common to those in the data transmitting method according to the first (a) aspect.

In the data transmitting method according to the first (c) aspect as well as the data transmitting method according to the first (a) aspect, of the number of transmitting antennas and the maximum number of supported antennas in the base station apparatus eNodeB, the smaller number of antennas is selected as a number of virtual antennas and a data channel signal (PUSCH) is transmitted from the mobile station apparatus UE in accordance with the number of virtual antennas $N_{min}$. It is thereby possible to perform data transmission with the number of virtual antennas $N_{min}$ that allows the data rate to be increased most effectively between the number of transmitting antennas of the mobile station apparatus UE and the maximum number of supported antennas in the base station apparatus eNodeB, and thereby increase the data rate to a maximum in MIMO transmission even when the number of transmitting antennas of the mobile station apparatus UE is different from the number of supported antennas of the mobile station apparatus UE supported by the base station apparatus eNodeB.

Particularly, in the data transmitting method according to the first (c) aspect, since the maximum number of supported antennas in the base station apparatus eNodeB is multiplexed with RRC signaling information and transmitted, and thereby reported to the mobile station apparatus UE, it is possible to flexibly report the maximum number of supported antennas in the base station apparatus eNodeB to the mobile station apparatus UE without restraints on the amount of information or the like compared to the case where the maximum number of supported antennas is multiplexed with MIB information or SIB information.

The data transmitting method according to the second aspect of the present invention is different from the data transmitting method according to the first aspect in that the mobile station apparatus UE reports the number of transmitting antennas of the mobile station apparatus UE to the base station apparatus eNodeB, the base station apparatus eNodeB compares the number of transmitting antennas reported from the mobile station apparatus UE with the maximum number of supported antennas in the base station apparatus eNodeB and selects the smaller number of antennas as a number of virtual antennas.

That is, in the data transmitting method according to the second aspect of the present invention, the mobile station apparatus UE reports the number of transmitting antennas of the mobile station apparatus UE to the base station apparatus eNodeB first. The base station apparatus eNodeB compares the number of transmitting antennas reported from the mobile station apparatus UE with the maximum number of supported antennas in the base station apparatus eNodeB. Of these numbers, the smaller number of antennas is selected as a number of virtual antennas. Next, the base station apparatus eNodeB instructs the mobile station apparatus UE to transmit a data channel signal in accordance with the number of virtual antennas reported from the mobile station apparatus UE. In response to this transmission instruction, the mobile station apparatus UE transmits a data channel signal in accordance with the number of virtual antennas using a MIMO transmission technique.

Figure 5:
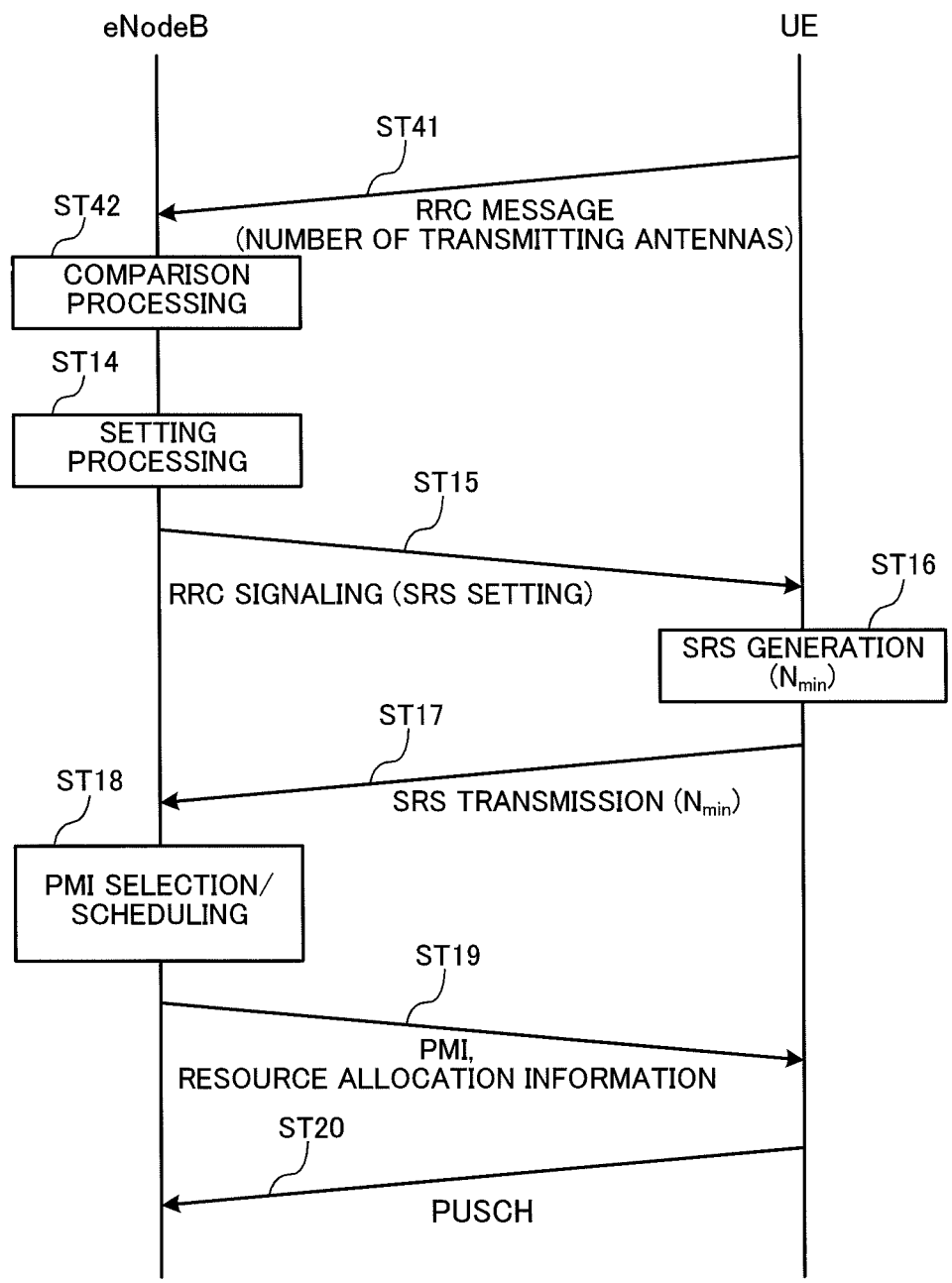
FIG. 5 is a sequence diagram illustrating a data transmitting method according to a second aspect of the present invention.

FIG. 5 is a sequence diagram illustrating the data transmitting method according to the second aspect of the present invention. In the sequence shown in FIG. 5, processes common to those in FIG. 2 will be assigned the same reference numerals and detailed descriptions thereof will be omitted.

As shown in FIG. 5, in the data transmitting method according to the second aspect, the mobile station apparatus UE reports the number of transmitting antennas of the mobile station apparatus UE to the base station apparatus eNodeB through an RRC message (ST41).

Upon receiving a report of the number of transmitting antennas through the RRC message, the base station apparatus eNodeB performs comparison processing of comparing the number of transmitting antennas with the maximum number of supported antennas in the base station apparatus eNodeB (ST42). As a result of the comparison processing, of the number of transmitting antennas and the maximum number of supported antennas in the base station apparatus eNodeB, the smaller number of antennas is selected as a number of virtual antennas $N_{min}$. Processes from the setting process using the selected number of virtual antennas $N_{min}$ onward are common to those of the data transmitting method according to the first aspect.

According to the data transmitting method according to the second aspect of the present invention, as in the case of the data transmitting method according to the first aspect, of the number of transmitting antennas and the maximum number of supported antennas in the base station apparatus eNodeB, the smaller number of antennas is selected as a number of virtual antennas and a data channel signal (PUSCH) is transmitted from the mobile station apparatus UE in accordance with the number of virtual antennas. It is thereby possible to perform data transmission with the number of virtual antennas that allows the data rate to be increased most effectively between the number of transmitting antennas and the number of supported antennas of the base station apparatus eNodeB, and thereby increase the data rate in MIMO transmission to a maximum even when the number of transmitting antennas of the mobile station apparatus UE is different from the number of antennas of the mobile station apparatus UE supported by the base station apparatus eNodeB. Furthermore, since the number of transmitting antennas of the mobile station apparatus UE is reported and the number of virtual antennas is selected based on the number of transmitting antennas, it is possible to avoid situations in which the number of transmitting antennas of the mobile station apparatus UE may not be comprehended appropriately, making subsequent data communication impossible.

Particularly, in the data transmitting method according to the second aspect, the mobile station apparatus UE reports the number of transmitting antennas of the mobile station apparatus UE to the base station apparatus eNodeB through an RRC message, the base station apparatus eNodeB compares the number of transmitting antennas reported from the mobile station apparatus UE with the maximum number of supported antennas in the base station apparatus eNodeB and selects the smaller number of antennas as a number of virtual antennas. This eliminates the necessity for multiplexing the maximum number of supported antennas in the base station apparatus eNodeB with MIB information or SIB information and transmitting the resulting information as in the case of the data transmitting method according to the first aspect, and can thereby omit control for multiplexing the maximum number of supported antennas with the MIB or SIB information.

In both data transmitting methods according to the first and second aspects, the base station apparatus eNodeB performs setting processing, and then transmits an SRS setting instruction to the mobile station apparatus UE based on the setting contents (ST15 shown in FIG. 2 to FIG. 5). On the other hand, upon receiving this SRS setting instruction, the mobile station apparatus UE generates an SRS in accordance with the number of virtual antennas $N_{min}$ (ST16 shown in FIG. 2 to FIG. 5). When an SRS setting instruction is transmitted based on the setting contents in the setting processing in this way, the amount of information (the number of bits) of the SRS setting instruction may increase or decrease in accordance with the setting contents. Furthermore, when the amount of information of the SRS setting instruction is large, the possibility that the SRS setting instruction may be erroneously detected by the mobile station apparatus UE also increases. Since this SRS setting instruction has a considerable effect on subsequent data communication, the SRS setting instruction needs to be detected appropriately.

As a method for the mobile station apparatus UE to appropriately detect the SRS setting instruction, a plurality of transmission modes for identifying the number of transmitting antennas used to transmit a data channel signal (PUSCH) may be defined beforehand, both the base station apparatus eNodeB and the mobile station apparatus UE may retain these transmission modes and identification information of the transmission modes may be transmitted from the base station apparatus eNodeB to the mobile station apparatus UE as an SRS setting instruction. When such transmission mode identification information is transmitted, it is possible to set the amount of information of the SRS setting instruction to a certain amount and also reduce the possibility of misdetection by the mobile station apparatus UE.

For example, in the transmission mode, it is preferable to define, in addition to the above-described 1-antenna transmission mode, a 2-antenna transmission mode in which 2-antenna transmission is performed or a 4-antenna transmission mode in which 4-antenna transmission is performed. By defining the 1-antenna transmission mode, 2-antenna transmission mode and 4-antenna transmission mode in this way, it is possible to support various transmission modes performed in uplink MIMO transmission. Furthermore, since a 1-antenna transmission mode is included, it is also possible to support a 1-antenna transmission mode defined in LTE-A systems.

Furthermore, in the data transmitting methods according to the first and second aspects, the number of transmitting antennas to be used for data transmission remains undefined until the mobile station apparatus UE transmits a data channel signal (PUSCH) in accordance with the number of virtual antennas $N_{min}$. For this reason, in the data transmitting methods according to the first and second aspects, it is preferable to decide to transmit a data channel signal in the 1-antenna transmission mode until the mobile station apparatus UE transmits the data channel signal (PUSCH) in accordance with the number of virtual antennas $N_{min}$. Thus, even in a state in which the number of transmitting antennas to be used for data transmission is not defined, it is possible to stably perform data transmission and reliably share the number of virtual antennas $N_{min}$ between the base station apparatus eNodeB and the mobile station apparatus UE.

Hereinafter, embodiments of the present invention will be described in detail with reference to the accompanying drawings. A case will be described here where a base station apparatus and a mobile station apparatus supporting an LTE-A system are used.

Figure 6:
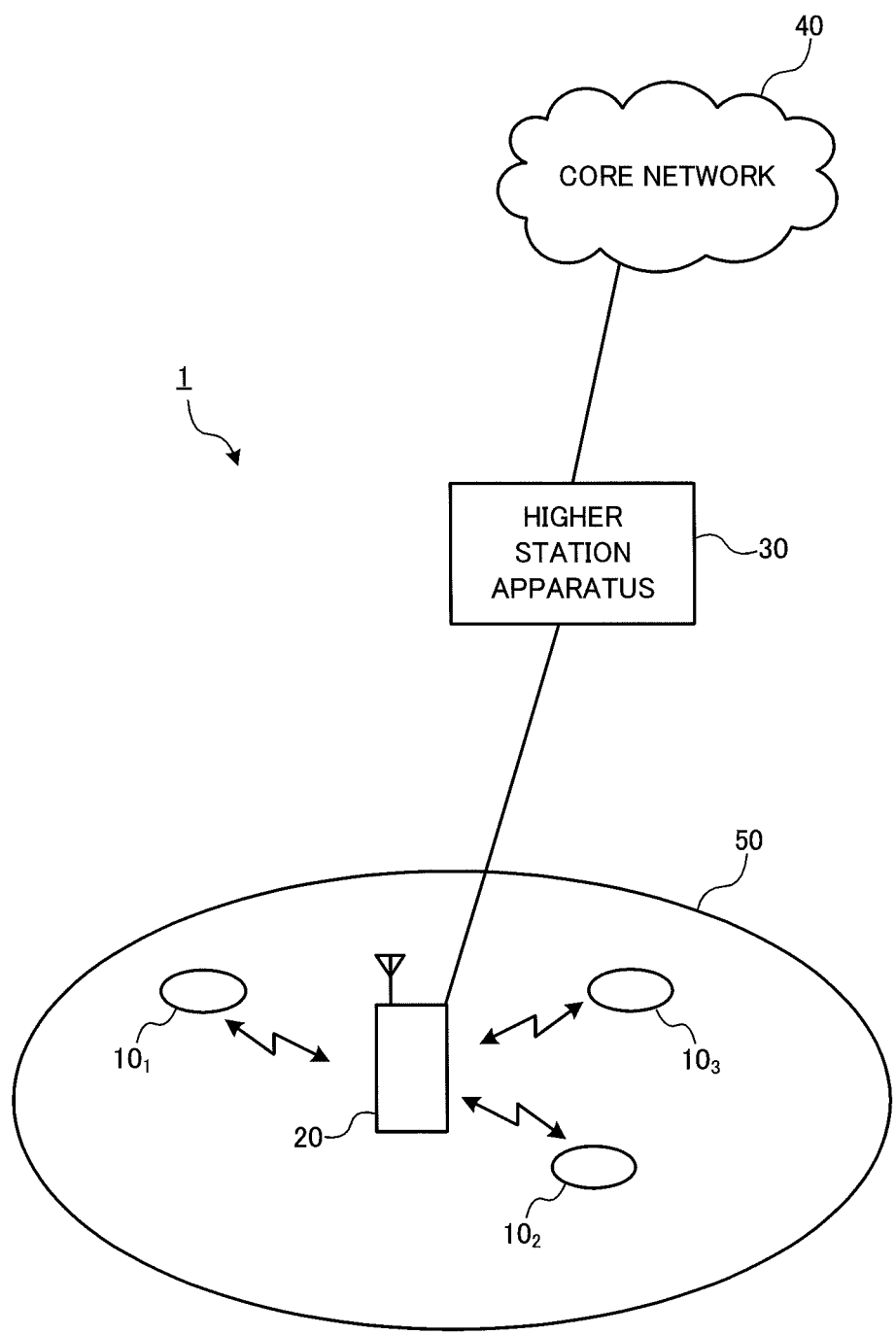
FIG. 6 is a diagram illustrating a configuration of a mobile communication system according to an embodiment of the present invention.

With reference to FIG. 6, a mobile communication system 1 will be described which includes a mobile station apparatus (UE) 10 and a base station apparatus (eNodeB) 20 according to an embodiment of the present invention. FIG. 6 is a diagram illustrating a configuration of the mobile communication system 1 including the mobile station apparatus 10 and the base station apparatus 20 according to the embodiment of the present invention. The mobile communication system 1 shown in FIG. 6 is a system that includes LTE system or SUPER 3G. Furthermore, this mobile communication system 1 may also be called "IMT-Advanced" or "4G."

As shown in FIG. 6, the mobile communication system 1 is configured by including the base station apparatus 20, and a plurality of mobile station apparatuses 10 ($10_1$, $10_2$, $10_3$, / ... $10_n$, n is an integer n>0) that communicate with the base station apparatus 20. The base station apparatus 20 is connected to a higher station apparatus 30 and this higher station apparatus 30 is connected to a core network 40. The mobile station apparatus 10 is communicating with the base station apparatus 20 in a cell 50. The higher station apparatus 30 includes, for example, an access gateway apparatus, a radio network controller (RNC), a mobility management entity (MME) or the like, but the higher station apparatus 30 is not limited to this.

Since the respective mobile station apparatuses ($10_1$, $10_2$, $10_3$, / ... $10_n$) have the same configuration, function and state, these mobile station apparatuses will be described as the mobile station apparatus 10 unless specified otherwise. For convenience of description, the mobile station apparatus 10 will be described as wirelessly communicating with the base station apparatus 20, but more generally, the mobile station apparatus 10 may be a user apparatus (UE: User Equipment) including a fixed terminal apparatus as well as a mobile terminal apparatus.

The mobile communication system 1 applies OFDMA (orthogonal frequency division multiple access) for a downlink and SC-FDMA (single carrier frequency division multiple access) for an uplink as a radio access scheme. OFDMA is a multicarrier transmission scheme that divides a frequency band into a plurality of narrow frequency bands (subcarriers) and maps data to each subcarrier to perform communication. SC-FDMA is a single carrier transmission scheme that divides the system band into bands made up of one or consecutive resource blocks per terminal so that a plurality of terminals use different bands and thereby reduce interference among terminals.

Here, a communication channel in an LTE system will be described. For a downlink, PDSCH shared among the mobile station apparatuses 10 and downlink L1/L2 control channel (PDCCH (Physical Downlink Control Channel), PCFICH (Physical Control Format Indicator Channel) and PHICH (Physical Hybrid-ARQ Indicator Channel)) are used. User data, that is, a normal data signal is transmitted through this PDSCH. Transmission data is included in this user data. CC and scheduling information assigned to the mobile station apparatus 10 by the base station apparatus 20 are reported to the mobile station apparatus 10 through the L1/L2 control channel.

For an uplink, PUSCH (Physical Uplink Shared Channel) shared among the mobile station apparatuses 10 and PUCCH (Physical Uplink Control Channel) which is an uplink control channel are used. User data is transmitted through this PUSCH. Furthermore, downlink radio quality information (CQI) or the like is transmitted through PUCCH.

Figure 7:
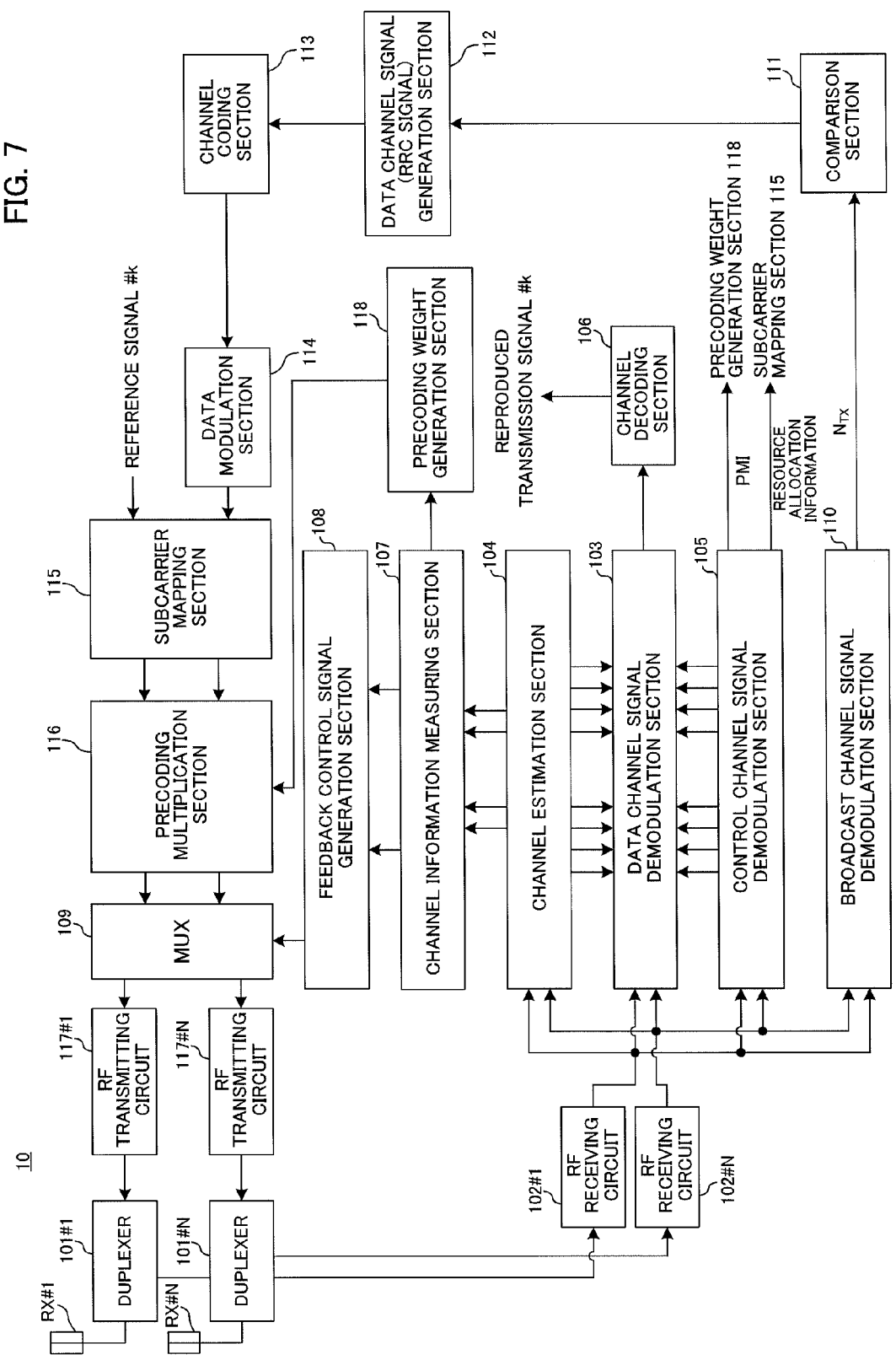
FIG. 7 is a block diagram illustrating a configuration of a mobile station apparatus according to the above embodiment.
Figure 8:
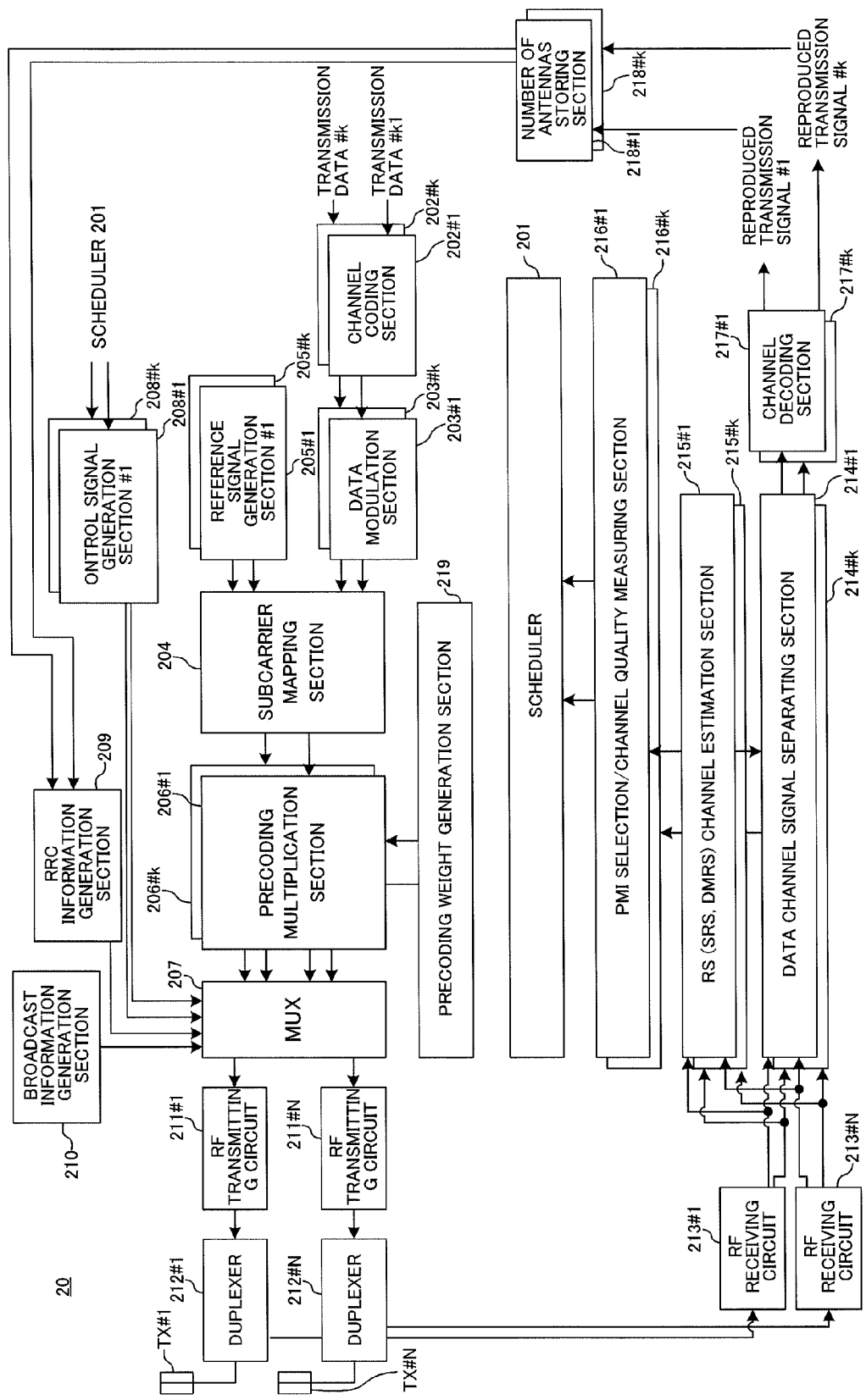
FIG. 8 is a block diagram illustrating a configuration of a base station apparatus according to the above embodiment.

FIG. 7 is a block diagram illustrating a configuration of the mobile station apparatus 10 according to the present embodiment. FIG. 8 is a block diagram illustrating a configuration of the base station apparatus 20 according to the present embodiment. The configurations of the mobile station apparatus 10 and the base station apparatus 20 shown in FIG. 7 and FIG. 8 are simplified to describe the present invention, and both apparatuses are assumed to be provided with configurations of an ordinary base station apparatus and mobile station apparatus. FIG. 7 and FIG. 8 in particular illustrate the configurations of the mobile station apparatus 10 and the base station apparatus 20 to which the data transmitting method according to the first aspect of the present invention is applied. The configurations of the mobile station apparatus 10 and the base station apparatus 20 to which the data transmitting method according to the second aspect of the present invention is applied will be described focusing on differences from the configurations shown in FIG. 7 and FIG. 8.

In the mobile station apparatus 10 shown in FIG. 7, a transmission signal transmitted from the base station apparatus 20 is received by antennas RX#1 to RX#N and electrically separated by duplexers 101#1 to 101#N into a transmission path and a reception path, and then outputted to RF receiving circuits 102#1 to 102#N. The received signals are subjected to frequency conversion processing of converting radio frequency signals to baseband signals in the RF receiving circuits 102#1 to 102#N, then Fourier-transformed in a fast Fourier transform section (FFT section) (not shown), whereby the signals are transformed from time-sequential signals into frequency-domain signals. The received signals transformed into the frequency-domain signals are outputted to a data channel signal demodulation section 103.

The data channel signal demodulation section 103 separates the received signal from the FFT section using, for example, a maximum likelihood detection (MLD) signal separating method. This causes the received signal arriving from the base station apparatus 20 to be separated into received signals relating to user #1 to user #k, and received signals relating to users of the mobile station apparatus 10 (here, suppose user k) are extracted. A channel estimation section 104 estimates a channel condition from a reference signal included in the received signal outputted from the FFT section and reports the estimated channel condition to the data channel signal demodulation section 103 and a channel information measuring section 107 which will be described later. The data channel signal demodulation section 103 separates the received signal based on the reported channel condition using the above-described MLD signal separating method.

A control channel signal demodulation section 105 demodulates a control channel signal (PDCCH) outputted from the FFT section. The control channel signal demodulation section 105 then reports control information included in the control channel signal to the data channel signal demodulation section 103. The data channel signal demodulation section 103 demodulates an extracted received signal relating to the user k based on the report contents from the control channel signal demodulation section 105. Prior to the demodulation processing by the data channel signal demodulation section 103, suppose the extracted received signal relating to the user k is demapped by a subcarrier demapping section (not shown) and converted back to a time-sequential signal. The received signal relating to the user k demodulated in the data channel signal demodulation section 103 is outputted to a channel decoding section 106. The channel decoding section 106 then applies channel decoding processing to the received signal and a transmission signal #k is thereby reproduced.

For example, as in the case of the data transmitting methods according to the above-described first (b) and first (c) aspects, when the maximum number of supported antennas $N_{TX}$ of the base station apparatus eNodeB is multiplexed with SIB information and RRC signaling information, the maximum number of supported antennas $N_{TX}$ of the base station apparatus eNodeB is included in the reproduced transmission signal #k. For this reason, when the data transmitting methods according to the above-described first (b) and first (c) aspects are applied, the maximum number of transmitting antennas $N_{TX}$ of the base station apparatus eNodeB is outputted from, for example, a channel decoding section 106 to a comparison section 111 which will be described later. The reception system including the data channel signal demodulation section 103 constitutes receiving section configured to receive the maximum number of supported antennas $N_{TX}$ of the base station apparatus eNodeB.

Furthermore, the signaling information of the reproduced transmission signal #k contains an SRS setting instruction in accordance with the number of virtual antennas. The SRS setting instruction is outputted to a reference signal generation section (not shown). The reference signal generation section generates an SRS in accordance with the number of virtual antennas according to the setting instruction. The SRS setting instruction constitutes instruction information for instructing transmission of a data channel signal in accordance with the number of virtual antennas, and the reception system including the data channel signal demodulation section 103 constitutes instruction information receiving section configured to receive instruction information for instructing transmission of a data channel signal in accordance with the number of virtual antennas.

A control signal transmitted from the base station apparatus 20 includes a PMI and resource allocation information. The control channel signal demodulation section 105 reports the PMI contained in the control channel signal to a precoding weight generation section 118 which will be described later. On the other hand, the control channel signal demodulation section 105 reports resource allocation information contained in the control channel signal to a subcarrier mapping section 115 which will be described later.

The channel information measuring section 107 measures channel information from the channel condition reported from the channel estimation section 104. To be more specific, the channel information measuring section 107 measures a CQI based on the channel condition reported from the channel estimation section 104, selects a PMI and an RI corresponding thereto and reports the PMI and RI to a feedback control signal generation section 108. Furthermore, the channel information measuring section 107 reports the selected PMI to the precoding weight generation section 118 which will be described later.

The precoding weight generation section 118 generates precoding weights corresponding to the respective antennas RX#1 to RX#N from the PMI reported from the control channel signal demodulation section 105 and the PMI selected by the channel information measuring section 107. A precoding weight in accordance with the number of virtual antennas $N_{min}$ is thereby generated. The precoding weight generation section 118 outputs the generated precoding weight to a precoding multiplication section 116 which will be described later.

The feedback control signal generation section 108 generates a control signal (e.g., PUCCH) that feeds back the PMI, CQI and RI reported from the channel information measuring section 107 to the base station apparatus 20 based thereon. The control signal generated in the feedback control signal generation section 108 is outputted to a multiplexer (MUX) 109.

A broadcast channel signal demodulation section 110 demodulates a broadcast channel signal (PBCH) outputted from the FFT section. For example, as the above-described data transmitting method according to the first (a) aspect, when the maximum number of supported antennas $N_{TX}$ of the base station apparatus eNodeB is multiplexed with the MIB information, the maximum number of supported antennas $N_{TX}$ of the base station apparatus eNodeB is included in a broadcast channel signal. For this reason, when the data transmitting method according to the first (a) aspect is applied, the maximum number of supported antennas $N_{TX}$ of the base station apparatus eNodeB is outputted from the broadcast channel signal demodulation section 110 to the comparison section 111 which will be described later. Broadcast information other than the maximum number of supported antennas $N_{TX}$ in the base station apparatus eNodeB is outputted to a higher layer (not shown). The reception system including the broadcast channel signal demodulation section 110 constitutes antenna information receiving section configured to receive the maximum number of supported antennas $N_{TX}$ in the base station apparatus eNodeB.

The comparison section 111 constitutes selecting section and compares the maximum number of supported antennas $N_{TX}$ in the base station apparatus eNodeB reported from the channel decoding section 106 (data transmitting methods according the first (b) and first (c) aspects) or the broadcast channel signal demodulation section 110 (data transmitting method according to the first (a) aspect) with the number of transmitting antennas of the mobile station apparatus 10. The number of transmitting antennas of the mobile station apparatus 10 is identified by UE capability information or UE category information indicating capability information of the mobile station apparatus 10. Of the number of transmitting antennas and the maximum number of supported antennas $N_{TX}$ in the base station apparatus eNodeB, the smaller number of antennas is selected as a number of virtual antennas $N_{min}$. The selected number of virtual antennas $N_{min}$ is outputted to a data channel signal generation section 112.

On the other hand, the transmission data #k relating to the user #k transmitted from a higher layer is outputted to the data channel signal generation section 112. In the data transmitting method according to the first aspect, the data channel signal generation section 112 generates an RRC control signal (RRC message) including the number of virtual antennas $N_{min}$ outputted from the comparison section 111. The data channel signal generation section 112 then generates a data channel signal #k including this RRC control signal and the transmission data #k and outputs the data channel signal #k to a channel coding section 113.

The data channel signal #k from the data channel signal generation section 112 is channel-coded by a channel coding section 113 and then data-modulated by a data modulation section 114. The data channel signal #k subjected to the data modulation in the data modulation section 114 is subjected to inverse Fourier transform in a discrete Fourier transform section (not shown), transformed from a time-sequential signal into a frequency-domain signal and outputted to the subcarrier mapping section 115.

The subcarrier mapping section 115 maps the data channel signal #k to subcarriers in accordance with schedule information (resource allocation information reported from the control channel signal demodulation section 105) instructed from the base station apparatus 20. In this case, the subcarrier mapping section 115 maps (multiplexes) a reference signal #k generated by a reference signal generation section (not shown) to the subcarriers together with the data channel signal #k. For example, the reference signal generation section generates a reference signal #k in accordance with the SRS setting instruction received from the base station apparatus 20 (e.g., SRS in accordance with the number of virtual antennas $N_{min}$). The data channel signal #k mapped to the subcarriers in this way is outputted to the precoding multiplication section 116.

The precoding multiplication section 116 performs phase and/or amplitude shift on the data channel signal #k for each of the receiving antennas RX#1 to RX#N based on a precoding weight reported from the precoding weight generation section 118. In this case, the precoding weight generation section 118 reports a precoding weight in accordance with the number of virtual antennas $N_{min}$. For this reason, the precoding multiplication section 116 can perform a phase and/or amplitude shift on the data channel signal #k in accordance with the number of virtual antennas $N_{min}$. The data channel signal #k phase and/or amplitude-shifted in the precoding multiplication section 116 is outputted to the multiplexer (MUX) 109.

The multiplexer (MUX) 109 multiplexes the phase and/or amplitude-shifted data channel signal #k with a control signal generated by the feedback control signal generation section 108 to generate a transmission signal for each of the receiving antennas RX#1 to RX#N. The transmission signal generated by the multiplexer (MUX) 109 is subjected to inverse fast Fourier transform in an inverse fast Fourier transform section (not shown), transformed from a frequency-domain signal to a time-domain signal and then outputted to RF transmitting circuits 117#1 to 117#N. The signal is subjected to frequency conversion processing of converting the signal to a radio frequency band in RF transmitting circuits 117#1 to 117#N and then outputted to the antennas RX#1 to RX#N via the duplexers 101#1 to 101#N and transmitted from the antennas RX#1 to RX#N to the base station apparatus 20 over an uplink.

In this case, the data channel signal #k is transmitted from the antennas RX#1 to RX#N to the base station apparatus 20 with a precoding weight generated by the precoding weight generation section 118 in accordance with the number of virtual antennas $N_{min}$. That is, the transmission system including the precoding weight generation section 118 constitutes data transmitting section configured to transmit a data channel signal in accordance with the number of virtual antennas. Furthermore, the data channel signal #k contains an RRC message including the number of virtual antennas $N_{min}$ generated by the data channel signal generation section 112. That is, the transmission including the data channel signal generation section 112 constitutes antenna information transmitting section configured to transmit the number of virtual antennas $N_{min}$ to the base station apparatus 20.

Thus, the mobile station apparatus 10 according to the present embodiment selects the smaller number of antennas of the maximum number of supported antennas $N_{TX}$ in the base station apparatus eNodeB and the number of transmitting antennas of the mobile station apparatus 10 as a number of virtual antennas $N_{min}$ and transmits this number of virtual antennas $N_{min}$ to the base station apparatus 20 through an RRC control signal (RRC message). Furthermore, the mobile station apparatus 10 generates an SRS in accordance with the number of virtual antennas $N_{min}$ received from the base station apparatus 20 and transmits a data channel signal based on the PMI and resource allocation information received from the base station apparatus 20. This allows the mobile station apparatus 10 to perform data transmission with the number of virtual antennas $N_{min}$ that allows the data rate to be increased most effectively between the maximum number of supported antennas $N_{TX}$ in the base station apparatus eNodeB and the number of transmitting antennas from the mobile station apparatus 10. As a result, it is possible to increase the data rate to a maximum in MIMO transmission even when the number of transmitting antennas of the mobile station apparatus 10 is different from the number of transmitting antennas of the mobile station apparatus 10 supported by the base station apparatus 20.

In the data transmitting method according to the second aspect, since the mobile station apparatus 10 transmits the number of transmitting antennas provided for the mobile station apparatus 10 multiplexed with an RRC control signal (RRC message), the function of the data channel signal generation section 112 is different from the mobile station apparatus 10 to which the data transmitting method according to the first aspect is applied. In the mobile station apparatus 10 to which the data transmitting method according to the second aspect is applied, the data channel signal generation section 112 generates an RRC control signal (RRC message) including the number of transmitting antennas of the mobile station apparatus 10 identified from the UE capability information or UE category information. The data channel signal generation section 112 then generates a data channel signal #k including this RRC control signal and transmission data #k and outputs the data channel signal #k to the channel coding section 113.

The mobile station apparatus 10 to which the data transmitting method according to the second aspect is applied transmits the number of transmitting antennas of the mobile station apparatus 10 to the base station apparatus 20 using an RRC control signal (RRC message). Furthermore, the mobile station apparatus 10 generates an SRS in accordance with the number of virtual antennas $N_{min}$ based on the SRS setting instruction received from the base station apparatus 20 and transmits a data channel signal based on a PMI and resource allocation information received from the base station apparatus 20. This allows the mobile station apparatus 10 to perform data transmission with the number of virtual antennas $N_{min}$ that allows the data rate to be increased most effectively between the maximum number of supported antennas $N_{TX}$ in the base station apparatus eNodeB and the number of transmitting antennas. As a result, it is possible to increase the data rate to a maximum in MIMO transmission even when the number of transmitting antennas of the mobile station apparatus 10 is different from the number of transmitting antennas of the mobile station apparatus 10 supported by the base station apparatus 20.

On the other hand, in the base station apparatus 20 shown in FIG. 8, a scheduler 201 determines a user to whom each resource is assigned based on channel quality (e.g., reception SINR) given from PMI selection/channel quality measuring sections 216#1 to 216#k which will be described later. The scheduler 201 then determines uplink resource allocation information (scheduling information) for each user. Furthermore, the scheduler 201 determines a TBS (Transport Block Size) based on channel quality information given from PMI selection/channel quality measuring sections 216#1 to 216#k which will be described later and multiplexes the TBS with a downlink control signal (PDCCH) together with resource allocation information and PMI, RI in control signal generation sections 208#1 to 208#k of the respective users.

For example, when the aforementioned data transmitting method according to the first (b) aspect is applied, transmission data #1 to #k containing SIB information with which the maximum number of supported antennas in the base station apparatus eNodeB is multiplexed are generated. The transmission data #1 to #k are sent to channel coding section 202#1 to 202#k. The transmission system including a transmission data generation section (not shown) that generates transmission data #1 to #k containing SIB information constitutes antenna information transmitting section configured to transmit the maximum number of supported antennas in the base station apparatus eNodeB to the mobile station apparatus 10.

The transmission data #1 to #k are subjected to channel coding in the channel coding sections 202#1 to 202#k, outputted to data modulation sections 203#1 to 203#k and data-modulated there. The transmission data #1 to #k data-modulated in the data modulation sections 203#1 to 203#k are subjected to inverse Fourier transform in a discrete Fourier transform section (not shown), transformed from time sequence signals to frequency-domain signals and outputted to a subcarrier mapping section 204.

Reference signal generation sections 205#1 to 205#k generate data channel demodulation specific reference signals (UE specific RSs) #1 to #k for user #1 to user #k. The specific reference signals #1 to #k generated in reference signal generation sections 205#1 to 205#k are outputted to the subcarrier mapping section 204.

The subcarrier mapping section 204 maps the transmission data #1 to #k from the data modulation sections 203#1 to 203#k and specific reference signals #1 to #k from the reference signal generation sections 205#1 to 205#k to subcarriers according to schedule information given from the scheduler 201. In this way, the transmission data #1 to #k mapped to the subcarriers are outputted to the precoding multiplication sections 206#1 to 206#k.

The precoding multiplication sections 206#1 to 206#k make phase and/or amplitude shift on transmission data #1 to #k for each of antennas TX#1 to TX#N based on precoding weights given from a precoding weight generation section 219 (weighting on the antennas TX#1 to #N through precoding). The transmission data #1 to #k phase and/or amplitude-shifted by the precoding multiplication sections 206#1 to 206#k are outputted to a multiplexer (MUX) 207.

Control signal generation sections 208#1 to 208#k generate control signals (PDCCH) #1 to #k based on the number of multiplexed users from the scheduler 201. The control signals generated in the control signal generation sections 208#1 to 208#k contain PMI or resource allocation information selected based on an SRS in accordance with the number of virtual antennas $N_{min}$ arriving from the mobile station apparatus 10. The control signals (PDCCH) #1 to #k generated by the control signal generation sections 208#1 to 208#k are outputted to the multiplexer (MUX) 207.

An RRC information generation section 209 generates RRC signaling information. For example, the RRC information generation section 209 generates RRC signaling information containing an SRS setting instruction for the mobile station apparatus 10 based on the number of virtual antennas $N_{min}$ from number of antennas storing sections 218#1 to 218#k which will be described later. Since the SRS setting instruction constitutes instruction information for instructing transmission of a data channel signal in accordance with the number of virtual antennas $N_{min}$, the transmission system including the RRC information generation section 209 constitutes instruction information transmitting section configured to transmit instruction information for instructing transmission of a data channel signal in accordance with the number of virtual antennas $N_{min}$ to the mobile station apparatus 10.

Furthermore, the RRC information generation section 209 in the aforementioned data transmitting method according to the first (c) aspect generates RRC signaling information with which the maximum number of supported antennas is multiplexed in the base station apparatus 20. The transmission system including the RRC information generation section 209 constitutes antenna information transmitting section configured to transmit the maximum number of supported antennas in the base station apparatus eNodeB to the mobile station apparatus 10. The RRC signaling information generated in the RRC information generation section 209 is outputted to the multiplexer (MUX) 207.

A broadcast information generation section 210 generates broadcast information (broadcast channel signal) to be broadcast to the mobile station apparatus 10. For example, in the aforementioned data transmitting method according to the first (a) aspect, the broadcast information generation section 210 generates broadcast information (broadcast channel signal) containing MIB information with which the maximum number of supported antennas in the base station apparatus 20 is multiplexed. The transmission system including the broadcast information generation section 210 constitutes antenna information transmitting section configured to transmit the maximum number of supported antennas in the base station apparatus eNodeB to the mobile station apparatus 10. The broadcast information generated by the broadcast information generation section 210 is outputted to the multiplexer (MUX) 207.

The multiplexer (MUX) 207 multiplexes the phase and/or amplitude-shifted transmission data #1 to #k, each PDCCH#1 to #k generated by the control signal generation sections 208#1 to 208#k, RRC signaling information generated by the RRC information generation section 209 and broadcast information generated by the broadcast information generation section 210 to generate a transmission signal for each of the transmitting antennas TX#1 to TX#N. The transmission signal generated in the multiplexer (MUX) 207 is subjected to inverse fast Fourier transform in an inverse fast Fourier transform section (not shown), transformed from a frequency-domain signal to a time-domain signal and then outputted to RF transmitting circuits 211#1 to 211#N. The transmission signal is then subjected to frequency conversion processing of converting the signal to a radio frequency band signal in the RF transmitting circuits 211#1 to 211#N, outputted to the antennas TX#1 to TX#N via duplexers 212#1 to 212#N and sent to the mobile station apparatus 10 from the antennas TX#1 to #N over a downlink.

On the other hand, the transmission signal sent from the mobile station apparatus 10 over the uplink is received by the antennas TX#1 to #N, electrically separated into a transmission path and a reception path via the duplexers 212#1 to 212#N, and outputted to RF receiving circuits 213#1 to 213#N. The signals are subjected to frequency conversion processing of converting radio frequency signals to baseband signals in the RF receiving circuits 213#1 to 213#N, then Fourier-transformed in a fast Fourier transform section (FFT section) (not shown), whereby the signals are transformed from time-sequential signals into frequency-domain signals. The received signals transformed into the frequency-domain signals are outputted to data channel signal separating sections 214#1 to 214#k.

The data channel signal separating sections 214#1 to 214#k separate the received signal inputted from the FFT section using, for example, a maximum likelihood detection (MLD) signal separating method. This causes the received signal arriving from the mobile station apparatus 10 to be separated into received signals relating to user #1 to user #k. RS channel estimation sections 215#1 to 215#k estimate a channel condition (DMRS channel estimate value) from a DMRS (Demodulate RS) signal included in the received signal outputted from the FFT section and report the DMRS channel estimate value to the data channel signal demodulation sections 214#1 to 214#k. Furthermore, the RS channel estimation sections 215#1 to 215#k estimate a channel condition (SRS channel estimate value) from the SRS signal included in the received signal and reports this SRS channel estimate value to the PMI selection/channel quality measuring sections 216#1 to 216#k. In this case, SRS channel estimate values are reported to the PMI selection/channel quality measuring sections 216#1 to 216#k in accordance with the number of virtual antennas $N_{min}$.

The data channel signal separating sections 214#1 to 214#k separate the received signal using the aforementioned MLD signal separating method based on the DMRS channel estimate value reported from the RS channel estimation sections 215#1 to 215#k. The received signals relating to user #1 to user #k separated by the data channel signal separating sections 214#1 to 214#k are converted back into time-sequential signals by being demapped in a subcarrier demapping section (not shown) and then subjected to data demodulation in a data demodulation section (not shown). The received signals are subjected to channel decoding processing in the channel decoding sections 217#1 to 217#k and transmission signals #1 to #k are thereby reproduced.

The reproduced transmission signals #1 to #k contain the number of virtual antennas $N_{min}$ in their RRC messages. The number of virtual antennas $N_{min}$ are outputted from, for example, channel decoding sections 217#1 to 217#k to the number of antennas storing sections 218#1 to 218#k. The reception system including the data channel signal separating section 214 that separates transmission signals #1 to #k containing RRC messages constitutes antenna information receiving section configured to receive the number of virtual antennas $N_{min}$ from the mobile station apparatus 10.

The PMI selection/channel quality measuring sections 216#1 to 216#k measure channel quality based on the SRS channel estimate values reported from the RS channel estimation sections 215#1 to 215#k and select PMI in accordance with the measured channel quality. The channel quality and PMI measured or selected in the PMI selection/channel quality measuring sections 216#1 to 216#k are outputted to the scheduler 201. The scheduler 201 determines resource allocation information based on the channel quality and PMI outputted from the PMI selection/channel quality measuring sections 216#1 to 216#k.

The number of antennas storing sections 218#1 to 218#k store the numbers of virtual antennas $N_{min}$ reported from the channel decoding sections 217#1 to 217#k. The number of antennas storing sections 218#1 to 218#k store the numbers of virtual antennas $N_{min}$ to be applied to the mobile station apparatuses 10#1 to 10#k respectively. The numbers of virtual antennas $N_{min}$ stored in the number of antennas storing sections 218#1 to 218#k are outputted to the RRC information generation section 209 as appropriate. The RRC information generation section 209 generates RRC signaling information containing an SRS setting instruction based on the number of virtual antennas $N_{min}$ given from the number of antennas storing sections 218#1 to 218#k.

The precoding weight generation section 219 generates precoding weights indicating the amount of phase and/or amplitude shift with respect to the transmission data #1 to #k. Each precoding weight generated is outputted to the precoding multiplication sections 206#1 to 206#k and used for precoding of the transmission data #1 to transmission data #k.

Thus, the base station apparatus 20 according to the present embodiment reports the maximum number of supported antennas in the base station apparatus 20 to the mobile station apparatus 10. Furthermore, the base station apparatus 20 transmits an SRS setting instruction in accordance with the number of virtual antennas $N_{min}$ reported from the mobile station apparatus 10 to the mobile station apparatus 10 and transmits the PMI and resource allocation information in accordance with the number of virtual antennas $N_{min}$ to the mobile station apparatus 10. This allows the data channel signal to be transmitted to the mobile station apparatus 10 in accordance with a number of virtual antennas $N_{min}$ made up of the smaller number of antennas of the number of transmitting antennas of the mobile station apparatus 10 and the maximum number of supported antennas in the base station apparatus 20. As a result, it is possible to perform data transmission with the number of virtual antennas that allows the data rate to be increased most effectively between the number of transmitting antennas of the mobile station apparatus 10 and the maximum number of supported antennas in the base station apparatus 20, and thereby increase the data rate to a maximum in MIMO transmission even when the number of transmitting antennas of the mobile station apparatus 10 is different from the maximum number of supported antennas in the base station apparatus 20.

In the data transmitting method according to the second aspect, the number of transmitting antennas is multiplexed with an RRC control signal (RRC message) and transmitted from the mobile station apparatus 10 and the base station apparatus 20 selects the number of virtual antennas $N_{min}$ based on the number of transmitting antennas. For this reason, the base station apparatus 20 to which the data transmitting method according to the second aspect is applied is different from the base station apparatus 20 to which the data transmitting method according to the first aspect is applied in that the former requires a configuration for selecting information stored in the number of antennas storing sections 218#1 to 218#k and the number of virtual antennas $N_{min}$.

In the base station apparatus 20 to which the data transmitting method according to the second aspect is applied, the number of antennas storing sections 218#1 to 218#k store the number of transmitting antennas of the mobile station apparatuses 10#1 to 10#k included in the transmission signals #1 to #k reproduced in the channel decoding sections 217#1 to 217#k. In the base station apparatus 20 to which the data transmitting method according to the second aspect is applied, a comparison section is added as selecting section configured to compare the number of transmitting antennas with the maximum number of supported antennas in the base station apparatus 20 and selecting the number of virtual antennas $N_{min}$. The comparison section outputs the selected number of virtual antennas $N_{min}$ to the RRC information generation section 209. The RRC information generation section 209 generates RRC signaling information containing this number of virtual antennas $N_{min}$ and outputs the RRC signaling information to the multiplexer (MUX) 207 as in the case of the base station apparatus 20 to which the data transmitting method according to the first aspect is applied.

The base station apparatus 20 to which the data transmitting method according to the second aspect is applied selects a number of virtual antennas $N_{min}$ based on the number of transmitting antennas reported from the mobile station apparatus 10, transmits an SRS setting instruction in accordance with the number of virtual antennas $N_{min}$ to the mobile station apparatus 10 and transmits the PMI and resource allocation information in accordance with the number of virtual antennas $N_{min}$ to the mobile station apparatus 10. As in the case of the base station apparatus 20 to which the data transmitting method according to the first aspect is applied, this allows a data channel signal to be transmitted to the mobile station apparatus 10 in accordance with the number of virtual antennas $N_{min}$ made up of the smaller number of antennas of the number of transmitting antennas of the mobile station apparatus 10 and the maximum number of supported antennas in the base station apparatus 20. As a result, it is possible to perform data transmission with the number of virtual antennas that allows the data rate to be increased most effectively between the number of transmitting antennas of the mobile station apparatus 10 and the maximum number of supported antennas in the base station apparatus 20 and thereby increase the data rate to a maximum in MIMO transmission even when the number of transmitting antennas of the mobile station apparatus 10 is different from the maximum number of supported antennas in the base station apparatus 20.

As described so far, in the data transmitting method according to the present invention, of the number of transmitting antennas of the mobile station apparatus 10 and the maximum number of supported antennas in the base station apparatus 20, the smaller number of antennas is selected as a number of virtual antennas and a data channel signal is transmitted from the mobile station apparatus 10 in accordance with the number of virtual antennas. This makes it possible to perform data transmission with the number of virtual antennas that allows the data rate to be increased most effectively between the number of transmitting antennas and the maximum number of supported antennas in the base station apparatus 20, and thereby increase the data rate to a maximum in MIMO transmission even when the number of transmitting antennas is different from the number of transmitting antennas of the mobile station apparatus 10 supported by the base station apparatus 20.

Furthermore, in the data transmitting method according to the present invention, since the number of virtual antennas is selected based on the number of transmitting antennas provided for the mobile station apparatus 10, it is possible to avoid situations in which the base station apparatus 20 may not appropriately comprehend the number of transmitting antennas, making subsequent data communication impossible.

The present invention has been described in detail using the above-described embodiments, but it is obvious to those skilled in the art that the present invention is not limited to the embodiments described in the present DESCRIPTION. The present invention can be implemented as modified or altered embodiments without departing from the spirit and scope of the present invention defined in the description of the scope of patent claims. Therefore, the description of the present DESCRIPTION is intended to be illustrative and by no means intended to limit the present invention.

The present application is based on Japanese Patent Application No. 2010-105398 filed on Apr. 30, 2010, entire content of which is expressly incorporated by reference herein.

The invention claimed is:

1. A data transmitting method comprising:
 a step of reporting a maximum number of supported antennas of a mobile station apparatus supported by a base station apparatus to the mobile station apparatus;
 a step of the mobile station apparatus comparing the number of supported antennas with the number of transmitting antennas of the mobile station apparatus and selecting the smaller number of antennas as a number of virtual antennas;
 a step of reporting the number of virtual antennas to the base station apparatus;
 a step of instructing the mobile station apparatus to transmit a data channel signal in accordance with the number of virtual antennas; and
 a step of transmitting the data channel signal from the mobile station apparatus in accordance with the number of virtual antennas.

2. The data transmitting method according to claim 1, wherein
 the number of supported antennas is multiplexed with MIB (Master Information Block) information and transmitted to the mobile station apparatus, the number of virtual antennas is reported to the base station apparatus through an RRC message, and
 instruction information for instructing transmission of a data channel signal in accordance with the number of virtual antennas is multiplexed with RRC signaling information and transmitted to the mobile station apparatus.

3. The data transmitting method according to claim 1, wherein the number of supported antennas is multiplexed with SIB (System Information Block) information and transmitted to the mobile station apparatus, the number of virtual antennas is reported to the base station apparatus through an RRC message, and instruction information for instructing transmission of a data channel signal in accordance with the number of virtual antennas is multiplexed with RRC signaling information and transmitted to the mobile station apparatus.

4. The data transmitting method according to claim 1, wherein the number of supported antennas is multiplexed with RRC signaling information and transmitted to the mobile station apparatus, the number of virtual antennas is reported to the base station apparatus through an RRC message, and instruction information for instructing transmission of a data channel signal in accordance with the number of virtual antennas is multiplexed with RRC signaling information and transmitted to the mobile station apparatus.

5. The data transmitting method according to claim 1, wherein the number of supported antennas is compared with the number of transmitting antennas contained in capability information stored in the mobile station apparatus and the number of virtual antennas is selected.

6. The data transmitting method according to claim 2, wherein a plurality of transmission modes for identifying the number of transmitting antennas to be used to transmit a data channel signal are defined, and the transmission mode corresponding to the number of virtual antennas is transmitted to the mobile station apparatus as the instruction information.

7. The data transmitting method according to claim 6, wherein a 1-antenna transmission mode using 1 transmitting antenna to transmit a data channel signal, a 2-antenna transmission mode using 2 transmitting antennas to transmit a data channel signal or a 4-antenna transmission mode using 4 transmitting antennas to transmit a data channel signal is defined as the transmission mode.

8. The data transmitting method according to claim 7, wherein a data channel signal is transmitted in the 1-transmitting-antenna mode until the mobile station apparatus transmits a data channel signal in accordance with the number of virtual antennas.

9. A data transmitting method comprising:
a step of reporting a number of transmitting antennas of a mobile station apparatus to a base station apparatus;
a step of the base station apparatus comparing the number of transmitting antennas with a maximum number of supported antennas of the mobile station apparatus supported by the base station apparatus and selecting the smaller number of antennas as a number of virtual antennas;
a step of instructing the mobile station apparatus to transmit a data channel signal in accordance with the number of virtual antennas; and
a step of transmitting a data channel signal from the mobile station apparatus in accordance with the number of virtual antennas.

10. The data transmitting method according to claim 9, wherein the number of transmitting antennas is reported to the base station apparatus through an RRC message and instruction information for instructing transmission a data channel signal in accordance with the number of virtual antennas is multiplexed with RRC signaling information and transmitted to the mobile station apparatus.

11. The data transmitting method according to claim 10, wherein a plurality of transmission modes for identifying the number of transmitting antennas to be used to transmit a data channel signal is defined and the transmission mode corresponding to the number of virtual antennas is transmitted to the mobile station apparatus as the instruction information.

12. The data transmitting method according to claim 11, wherein a 1-antenna transmission mode using 1 transmitting antenna to transmit a data channel signal, a 2-antenna transmission mode using 2 transmitting antennas to transmit a data channel signal or a 4-antenna transmission mode using 4 transmitting antennas to transmit a data channel signal is defined as the transmission mode.

13. The data transmitting method according to claim 12, wherein a data channel signal is transmitted in the 1-transmitting-antenna mode until the mobile station apparatus transmits a data channel signal in accordance with the number f virtual antennas.

14. A base station apparatus comprising:
antenna information transmitting section configured to transmit a maximum number of supported antennas of a mobile station apparatus supported by the base station apparatus to the mobile station apparatus;
antenna information receiving section configured to receive, from the mobile station apparatus, a number of virtual antennas made up of the smaller number of antennas of the number of supported antennas and the number of transmitting antennas of the mobile station apparatus; and
instruction information transmitting section configured to transmit instruction information for instructing transmission of a data channel signal in accordance with the number of virtual antennas to the mobile station apparatus.

15. A base station apparatus comprising:
antenna information receiving section configured to receive the number of transmitting antennas of a mobile station apparatus;
selecting section configured to compare the number of transmitting antennas with a maximum number of supported antennas of the mobile station apparatus supported by the base station apparatus and selecting the smaller number of antennas as a number of virtual antennas; and
instruction information transmitting section configured to transmit instruction information for instruction transmission of a data channel signal in accordance with the number of virtual antennas to the mobile station apparatus.

16. A mobile station apparatus comprising:
antenna information receiving section configured to receive a maximum number of supported antennas of the mobile station apparatus supported by a base station apparatus;
selecting section configured to compare the number of supported antennas with the number of transmitting antennas of the mobile station apparatus and selecting the smaller number of antennas as a number of virtual antennas;
antenna information transmitting section configured to transmit the number of virtual antennas to the base station apparatus;
instruction information receiving section configured to receive instruction information for instructing transmission of a data channel signal in accordance with the number of virtual antennas; and data transmitting section configured to transmit a data channel signal in accordance with the number of virtual antennas based on the instruction information.

17. A mobile station apparatus comprising:

antenna information transmitting section configured to transmit the number of transmitting antennas of the mobile station apparatus to a base station apparatus;

instruction information receiving section configured to receive instruction information for instructing transmission a data channel signal using a number of virtual antennas made up of the smaller number of antennas of the number of transmitting antennas and a maximum number of supported antennas of the mobile station apparatus supported by the base station apparatus; and data transmitting section configured to transmit a data channel signal in accordance with the number of virtual antennas based on the instruction information.

18. The data transmitting method according to claim 3, wherein a plurality of transmission modes for identifying the number of transmitting antennas to be used to transmit a data channel signal are defined, and the transmission mode corresponding to the number of virtual antennas is transmitted to the mobile station apparatus as the instruction information.

19. The data transmitting method according to claim 4, wherein a plurality of transmission modes for identifying the number of transmitting antennas to be used to transmit a data channel signal are defined, and the transmission mode corresponding to the number of virtual antennas is transmitted to the mobile station apparatus as the instruction information.

* * * * *